(12) United States Patent
Nagashima et al.

(10) Patent No.: US 12,632,931 B2
(45) Date of Patent: May 19, 2026

(54) INSPECTION SYSTEM, IMAGE PROCESSING METHOD, AND DEFECT INSPECTION DEVICE

(71) Applicant: SHIMADZU CORPORATION, Kyoto (JP)

(72) Inventors: Tomotaka Nagashima, Kyoto (JP); Takahide Hatahori, Kyoto (JP); Hisanori Morita, Kyoto (JP); Kenji Takubo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 613 days.

(21) Appl. No.: 17/964,884

(22) Filed: Oct. 12, 2022

(65) Prior Publication Data

US 2023/0114484 A1    Apr. 13, 2023

(30) Foreign Application Priority Data

Oct. 13, 2021    (JP) ................................. 2021-168296

(51) Int. Cl.
*G06T 5/70* (2024.01)
*G01N 21/45* (2006.01)
(Continued)

(52) U.S. Cl.
CPC .............. *G06T 5/70* (2024.01); *G01N 21/45* (2013.01); *G01N 21/88* (2013.01); *G06T 5/50* (2013.01);
(Continued)

(58) Field of Classification Search
CPC ........... G06T 5/70; G06T 5/50; G06T 7/0004; G01N 21/45; G01N 21/88; G01N 2201/02;
(Continued)

(56) References Cited

U.S. PATENT DOCUMENTS 11,279,062 B2 *    3/2022    Das ....................... B29C 64/129
2015/0334318 A1    11/2015    Georgiev et al.
(Continued)

FOREIGN PATENT DOCUMENTS

JP        2015104668        6/2015
JP        2016509208        3/2016
(Continued)

OTHER PUBLICATIONS

"Amitai Uzan et. al., Speckle Denoising in Digital Holography by NonLocal Means Filtering, 2013, Applied Optics, vol. 52, pp. A195-A200" (Year: 2013).*
(Continued)

*Primary Examiner* — Chineyere Wills-Burns
*Assistant Examiner* — Phuong Hau Cai
(74) *Attorney, Agent, or Firm* — JCIPRNET

(57) ABSTRACT

An inspection system includes an image processing unit that suppresses noise of a complex number image on which pixels are represented by a complex number indicating a periodic change in a vibration state of an inspection target. The image processing unit acquires a degree of similarity between a pixel included in a target image region defined in the complex number image and a pixel included in a plurality of reference image regions defined in the complex number image separately from the target image region by comparing complex numbers representing pixels, and executes noise suppression processing of the target image region by using a weight based on the acquired degree of similarity.

12 Claims, 10 Drawing Sheets

(51) Int. Cl.
    *G01N 21/88*     (2006.01)
    *G06T 5/50*     (2006.01)

(52) U.S. Cl.
    CPC ..................... *G01N 2201/02* (2013.01); *G01N 2201/06113* (2013.01)

(58) Field of Classification Search
    CPC ....... G01N 2201/06113; G01N 29/043; G01N 29/0654; G01N 29/2418; G01N 29/32; G01N 29/4436; G01H 9/00
    See application file for complete search history.

(56)           References Cited

U.S. PATENT DOCUMENTS

2017/0350690 A1*  12/2017  Hatahori ............. G01M 5/0091
2022/0180500 A1    6/2022  Yoshida et al.

FOREIGN PATENT DOCUMENTS

JP      2017219318    12/2017
WO    2020213101    10/2020

OTHER PUBLICATIONS

"Zhoubo Li et. al., Adaptive Nonlocal Means Filtering Based on Local Noise Level for CT Denoising, Dec. 2013, Medical Physics, The International Journal of Medical Physics Research and Practice" (Year: 2013).*

"Vittorio Bianco et. al., Strategies for Reducing Speckle Noise in Digital Holography, Aug. 2018, Light: Science and Application, Article No. 48" (Year: 2018).*

Toshinori Nakajima et al., "Vibration Analysis by Holography," Applied Physics, vol. 41, Apr. 1972, with English translation thereof, pp. 1-34.

Antoni Buades et al., "A non-local algorithm for image denoising," 2005 IEEE Computer Society Conference on Computer Vision and Pattern Recognition (CVPR'05), Jul. 2005, pp. 1-6.

Charles Kervrann et al., "Bayesian Non-local Means Filter, Image Redundancy and Adaptive Dictionaries for Noise Removal," Conference: Proceedings of the 1st international conference on Scale space and variational methods in computer vision, May 2007, pp. 1-12.

Pierrick Coupé et al., "Nonlocal means-based speckle filtering for ultrasound images," IEEE Transactions on Image Processing, vol. 18, Oct. 2009, pp. 2221-2229.

Amitai Uzan et al., "Speckle denoising in digital holography by nonlocal means filtering," Applied Optics, vol. 52, Nov. 2012, pp. 1-6.

"Office Action of China Counterpart Application", with English translation thereof, issued on Jun. 24, 2025, pp. 1-16.

"Office Action of Japan Counterpart Application", issued on Apr. 1, 2025, with English translation thereof, pp. 1-10.

"Office Action of China Counterpart Application", issued on Mar. 13, 2026, with English translation thereof, pp. 1-11.

\* cited by examiner

FIG. 9

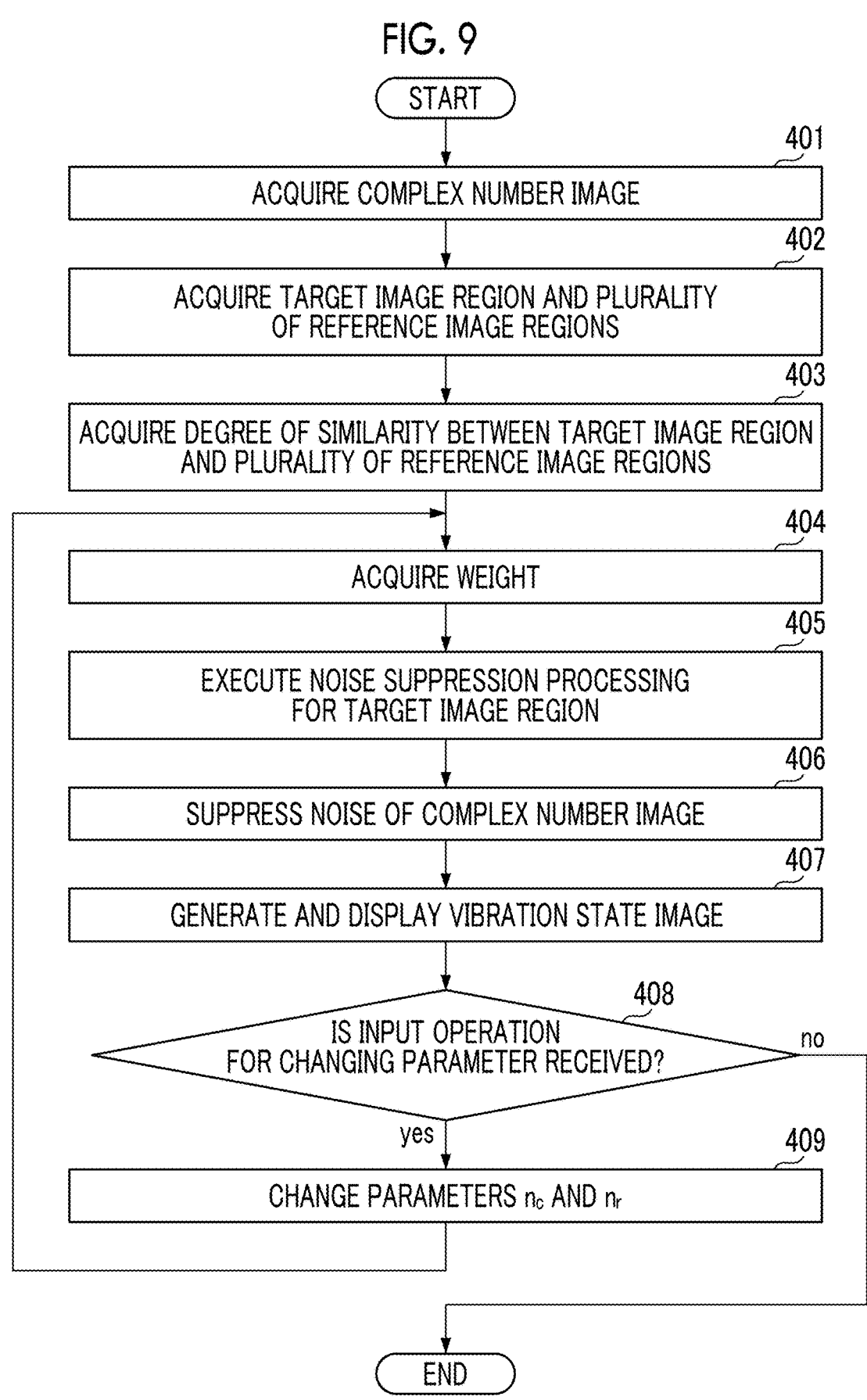

START

401
ACQUIRE COMPLEX NUMBER IMAGE

402
ACQUIRE TARGET IMAGE REGION AND PLURALITY
OF REFERENCE IMAGE REGIONS

403
ACQUIRE DEGREE OF SIMILARITY BETWEEN TARGET IMAGE REGION
AND PLURALITY OF REFERENCE IMAGE REGIONS

404
ACQUIRE WEIGHT

405
EXECUTE NOISE SUPPRESSION PROCESSING
FOR TARGET IMAGE REGION

406
SUPPRESS NOISE OF COMPLEX NUMBER IMAGE

407
GENERATE AND DISPLAY VIBRATION STATE IMAGE

408
IS INPUT OPERATION
FOR CHANGING PARAMETER RECEIVED?                    no yes 409
CHANGE PARAMETERS $n_c$ AND $n_r$

END

200

INSPECTION SYSTEM

| VIBRATOR | 1 |
| IRRADIATION UNIT | 2 |
| SPECKLE SHEARING INTERFEROMETER | 3 |
| CONTROL UNIT | 204 |
| SIGNAL GENERATOR | 5 |
| DISPLAY UNIT | 6 |
| OPERATION UNIT | 7 |

INSPECTION SYSTEM, IMAGE PROCESSING METHOD, AND DEFECT INSPECTION DEVICE

CROSS-REFERENCE TO RELATED APPLICATIONS

The related application number JP2021-168296, an inspection system, an image processing method, and a defect inspection device, Oct. 13, 2021, Tomotaka Nagashima, Takahide Hatahori, Hisanori Morita, and Kenji Takubo upon which this patent application is based are hereby incorporated by reference.

BACKGROUND OF THE INVENTION

Field of the Invention

The present invention relates to an inspection system, an image processing method, and a defect inspection device.

Background Art

In the related art, a defect inspection device that measures a vibration state of an inspection target has been known. Such a device is disclosed in, for example, JP2017-219318A.

The defect inspection device described in JP2017-219318A includes an excitation unit that excites an elastic wave in an object to be inspected, an illumination unit that irradiates a measurement region on a surface of the object to be inspected with strobe illumination, and a displacement measurement unit. The displacement measurement unit is configured to measure displacements of points in the measurement region in a front-rear direction in at least three different phases of an elastic wave by controlling a phase of the elastic wave and a timing of the strobe illumination. This defect inspection device measures the vibration state (amplitude and phase) of each point in the measurement region by measuring the displacements of the points in the measurement region in the front-rear direction. JP2017-219318A discloses a configuration for generating an image based on the measured vibration state (amplitude and phase) of each point in the measurement region.

Here, although not described in JP2017-219318A, in a case where the measurement region is measured and the image is generated, noise may be included in the generated image. For example, in a case where the image is generated by measuring the vibration state by a laser interference method as in the defect inspection device described in JP2017-219318A, the noise occurs in the generated image due to thermal noise or vibration of the device caused by an irregular motion of electrons in a conductor. In such a case, noise suppression processing of suppressing noise contained in the image is generally executed for the generated image. However, as in the defect inspection device described in JP2017-219318A, in a case where the image is obtained by measuring the vibration state that changes periodically, such as an object to be inspected (inspection target) in which an elastic wave is excited, a noise state of the generated image may change in accordance with the vibration state that changes periodically. In this case, it is considered that in a case where noise is suppressed for the generated image, the noise that changes in accordance with the vibration state is not sufficiently suppressed. Thus, it is desired to effectively suppress the noise even though the periodic change in the state is measured.

SUMMARY OF THE INVENTION

An inspection system according to a first aspect of the present invention includes an excitation unit that excites an elastic wave in an inspection target, a measurement unit that measures a vibration state in the inspection target in which the elastic wave is excited by the excitation unit, and an image processing unit configured to suppress noise of a complex number image on which pixels are represented by a complex number indicating a periodic change in the vibration state of the inspection target based on a measurement result of the measurement unit. The image processing unit acquires a degree of similarity between a pixel included in a target image region defined in the complex number image and a pixel included in a plurality of reference image regions defined in the complex number image separately from the target image region by comparing complex numbers representing pixels, and executes noise suppression processing of the target image region by using a weight based on the acquired degree of similarity.

An image processing method according to a second aspect of the present invention includes a step of acquiring a complex number image on which pixels are represented by a complex number indicating a periodic change in a state, a step of acquiring a target image region defined in the acquired complex number image and a plurality of reference image regions defined in the complex number image separately from the target image region, a step of acquiring a degree of similarity between a pixel included in the acquired target image region and a pixel included in the plurality of reference image regions by comparing complex numbers representing pixels, and a step of executing noise suppression processing of the target image region by using a weight based on the acquired degree of similarity.

A defect inspection device according to a third aspect of the present invention includes an excitation unit that excites an elastic wave in an inspection target, an irradiation unit that irradiates the inspection target in which the elastic wave is excited by the excitation unit with laser beams, a measurement unit that measures a vibration state of the inspection target in which the elastic wave is excited by the excitation unit by causing a reflected laser beam which is the laser beam emitted by the irradiation unit and reflected on the inspection target and a reference laser beam which is the laser beam emitted by the irradiation unit to interfere with each other and capturing and measuring interference light obtained by causing the reflected laser beam and the reference laser beam to interfere with each other, and a control unit configured to suppress noise of a complex number image for defect inspection on which pixels are represented by a complex number indicating a periodic change in the vibration state of the inspection target based on a measurement result of the measurement unit. The control unit acquires a degree of similarity between a pixel included in a target image region defined in the complex number image and a pixel included in a plurality of reference image regions defined in the complex number image separately from the target image region by comparing complex numbers representing pixels, and executes noise suppression processing of the target image region by using a weight based on the acquired degree of similarity.

In the inspection system according to the first aspect, the image processing method according to the second aspect, and the defect inspection device according to the third aspect, the degree of similarity between the pixel included in the target image region defined in the complex number image and the pixel included in the plurality of reference image regions defined in the complex number image separately from the target image region is acquired by comparing the complex numbers representing the pixels. The noise suppression processing of the target image region is executed by using the weight based on the acquired degree of similarity. As a result, the noise of the complex number image can be suppressed by executing the noise suppression processing of the target image region defined in the complex number image. Thus, since the complex number image on which the pixels are represented by the complex number indicating the periodic change in the state reflects the periodic change in the vibration state, unlike a case where the noise suppression processing is executed for the image represented by the real value, the noise can be effectively suppressed even though the noise state changes in accordance with the vibration state by suppressing the noise of the complex number image. As a result, noise can be effectively suppressed even though the periodic change in the state is measured.

BRIEF DESCRIPTION OF THE DRAWINGS

FIG. 9 is a diagram (flow chart) for describing an image processing method according to the first embodiment.

DETAILED DESCRIPTION OF THE INVENTION

Embodiments of the present invention provide an inspection system, an image processing method, and a defect inspection device capable of effectively suppressing noise even though a periodic change in a state is measured.

Hereinafter, embodiments embodying the present invention will be described with reference to the drawings.

First Embodiment

Overall Configuration of Inspection System

An inspection system 100 according to a first embodiment of the present invention will be described with reference to FIGS. 1 to 8.

Figure 1:
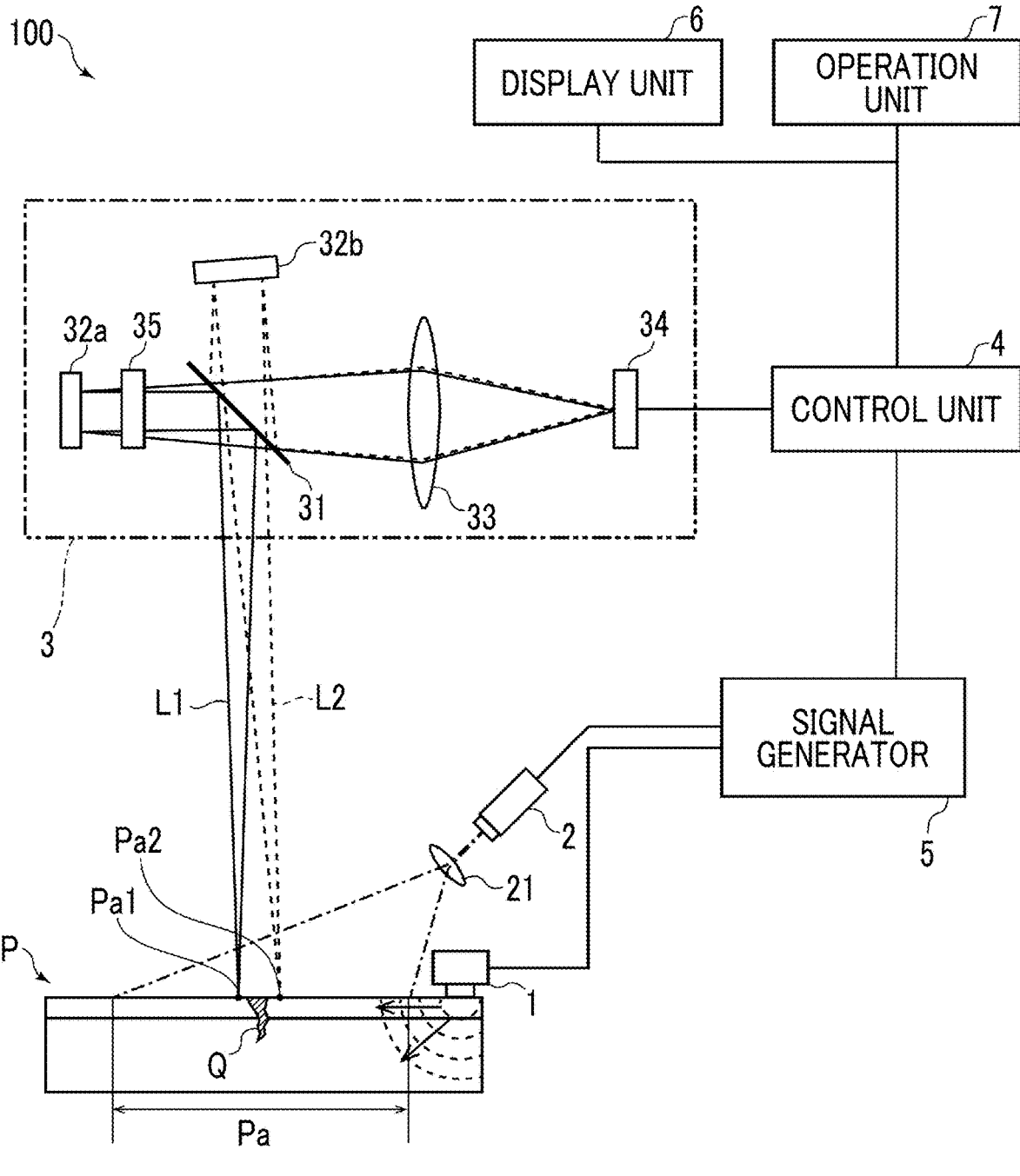
FIG. 1 is a diagram for describing a configuration of an inspection system according to a first embodiment.

As illustrated in FIG. 1, the inspection system 100 according to the first embodiment includes a vibrator 1, an irradiation unit 2, a speckle shearing interferometer 3, a control unit 4, a signal generator 5, a display unit 6, and an operation unit 7. The vibrator 1 is an example of an "excitation unit" in the claims, and the speckle shearing interferometer 3 is an example of a "measurement unit" in the claims. The control unit 4 is an example of an "image processing unit" within the claims.

The vibrator 1 and the irradiation unit 2 are connected to the signal generator 5 via a cable. The speckle shearing interferometer 3, the signal generator 5, the display unit 6, and the operation unit 7 are connected to the control unit 4 via a cable.

The vibrator 1 excites an elastic wave in a measurement region Pa of an inspection target P. Specifically, the vibrator 1 is disposed so as to be in contact with the inspection target P, converts an AC signal from the signal generator 5 into mechanical vibration, and generates excitation vibration to excite the elastic wave in the measurement region Pa. A frequency of the elastic wave excited in the inspection target P by the vibrator 1 is equal to a frequency of the vibration (excitation vibration) of the vibrator 1. That is, a frequency of the AC signal input to the vibrator 1 and the frequency of the elastic wave excited in the inspection target P by the vibrator 1 are equal frequencies.

The irradiation unit 2 irradiates the measurement region Pa of the inspection target P in which the elastic wave is excited by the vibrator 1 with laser beams. The irradiation unit 2 includes a laser light source (not shown). The laser beams emitted from the laser light source are applied while spreading over the entire measurement region Pa on a surface of the inspection target P by an illumination light lens 21. The irradiation unit 2 applies the laser beams at a predetermined timing based on an electric signal from the signal generator 5. That is, the irradiation unit 2 irradiates the inspection target P with the laser beams corresponding to the elastic wave generated by the vibrator 1. The laser light source is, for example, a laser diode and applies laser beams (near infrared light) having a wavelength of 785 nm.

In the first embodiment, the speckle shearing interferometer 3 measures a vibration state in the measurement region Pa of the inspection target P in which the elastic wave is excited by the vibrator 1. Specifically, the speckle shearing interferometer 3 is irradiated by the irradiation unit 2, causes laser beams reflected in the measurement region Pa of the inspection target P to interfere with each other by a laser interference method, and captures the interfered laser beams (interference light). Specifically, the speckle shearing interferometer 3 causes laser beams (reflected laser beam and reference laser beam) reflected at two different points in the measurement region Pa of the inspection target P excited by the vibrator 1 to interfere with each other by the laser interference method. The speckle shearing interferometer 3 includes a beam splitter 31, a first reflecting mirror 32a, a second reflecting mirror 32b, a condenser lens 33, an image sensor 34, and a phase shifter 35.

The beam splitter 31 includes a half mirror. The beam splitter 31 is disposed at a position where the laser beam reflected in the measurement region Pa of the inspection target P is incident. The beam splitter 31 reflects the incident laser beam toward the first reflecting mirror 32a like an optical path illustrated by a straight line L1 in FIG. 1, and transmits the laser beam to the second reflecting mirror 32b like an optical path illustrated by a broken line L2 in FIG. 1. The beam splitter 31 transmits the incident laser beam reflected by the first reflecting mirror 32a to the image sensor 34 like the optical path illustrated by the straight line L1 in FIG. 1, and reflects the laser beam reflected by the second reflecting mirror 32b toward the image sensor 34 as illustrated by the broken line L2 in FIG. 1.

The first reflecting mirror 32a is disposed so as to have an angle of 45 degrees with respect to a reflecting surface of the beam splitter 31 on an optical path of the laser beam reflected by the beam splitter 31. The first reflecting mirror 32a reflects the laser beam reflected by the beam splitter 31 toward the beam splitter 31.

The second reflecting mirror 32b is disposed at an angle slightly inclined from an angle of 45 degrees with respect to the reflecting surface of the beam splitter 31 on an optical path of the laser beam transmitting through the beam splitter 31. The second reflecting mirror 32b reflects the laser beam transmitted through the beam splitter 31 and incident toward the beam splitter 31.

The condenser lens 33 is disposed between the beam splitter 31 and the image sensor 34, and causes the laser beam transmitted through the beam splitter 31 (straight line L1 in FIG. 1) and the laser beam reflected by the beam splitter 31 (broken line L2 in FIG. 1) to be focused.

The image sensor 34 captures the interference light which is the interfered laser beams. The image sensor 34 has a large number of detection elements disposed in a planar shape, and is disposed on the optical path of the laser beam (straight line L1 in FIG. 1) reflected by the beam splitter 31, then reflected by the first reflecting mirror 32a, and transmitted through the beam splitter 31 and the laser beam (broken line L2 in FIG. 1) transmitted through the beam splitter 31, then reflected by the second reflecting mirror 32b, and reflected by the beam splitter 31. The image sensor 34 includes, for example, a CMOS image sensor, a CCD image sensor, or the like.

The phase shifter 35 is disposed between the beam splitter 31 and the first reflecting mirror 32a, and changes (shifts) a phase of the transmitted laser beam (straight line L1 in FIG. 1) under the control of the control unit 4. Specifically, the phase shifter 35 is configured to change an optical path length of the transmitted laser beam.

In the speckle shearing interferometer 3, for example, the laser beam reflected by a position Pa1 on the surface of the measurement region Pa and the first reflecting mirror 32a (straight line L1 in FIG. 1) and the laser beam reflected by a position Pa2 on the surface of the measurement region Pa and the second reflecting mirror 32b (broken line L2 in FIG. 1) interfere with each other and are incident on the same location of the image sensor 34 (detected by the same element). The positions Pa1 and Pa2 are positions separated from each other by a small distance. The laser beams (reflected laser beam and reference laser beam) reflected from different positions (Pa1 and Pa2) in each region of the measurement region Pa are guided by the speckle shearing interferometer 3 to become the interference light, and are incident on the image sensor 34.

The control unit 4 controls each unit of the speckle shearing interferometer 3 and controls an operation of the signal generator 5. The control unit 4 is, for example, a computer including a central processing unit (CPU). The control unit 4 includes a storage device that stores various parameters, programs, and the like. The details of the control of the control unit 4 will be described later.

The signal generator 5 outputs an AC signal for controlling the vibration of the vibrator 1 and a timing of irradiation of the laser beam of the irradiation unit 2 based on the control by the control unit 4. The signal generator 5 includes, for example, a field-programmable gate array (FPGA).

The display unit 6 displays an image generated by the control unit 4. Specifically, the display unit 6 displays a vibration state image E (see FIG. 2), which will be described later, generated by the control unit 4. The display unit 6 includes a liquid crystal display, an organic electro-luminescence (EL) display, and the like.

The operation unit 7 receives an input operation by an inspection worker. The operation unit 7 is a pointing device such as a keyboard and a mouse. The operation unit 7 outputs an operation signal based on the received input operation to the control unit 4.

The inspection target P is, for example, a coated steel sheet in which a coating film is coated on the steel sheet. A defect Q is a defective portion occurring inside (surface layer or surface) of the measurement region Pa, and includes cracks, peeling, and the like.

Control by Control Unit

Figure 2:
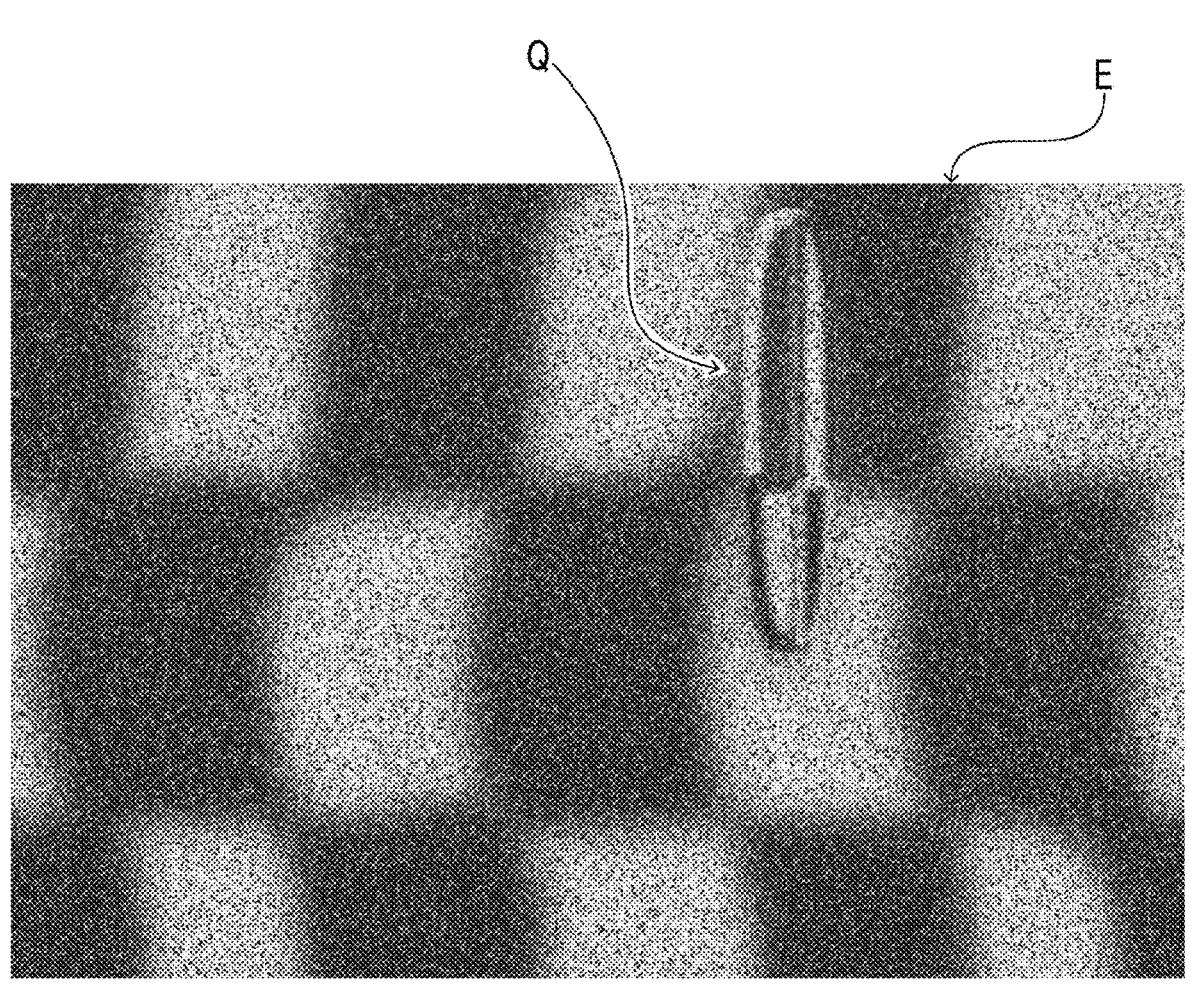
FIG. 2 is a schematic diagram showing an example of a vibration state image according to the first embodiment.

As illustrated in FIG. 2, the control unit 4 generates a vibration state image E for inspecting the defect Q based on the interference light measured by the speckle shearing interferometer 3. The vibration state image E is a generated image in which the vibration state of the elastic wave excited in the measurement region Pa of the inspection target P is visually recognizable. For example, the vibration state image E is an image in which a position of the defect Q (defective portion) included in the inspection target P is recognizable by visually recognizing the discontinuity of the vibration state.

In the first embodiment, the control unit 4 executes processing of suppressing noise in the generated vibration state image E. Specifically, in the first embodiment, the control unit 4 generates a complex number image D (see FIG. 4) for defect inspection on which pixels represented by a complex number indicating a periodic change in the vibration state of the inspection target P in the measurement region Pa based on the measurement result by the speckle shearing interferometer 3. The control unit 4 is configured to suppress the noise in the vibration state image E by executing the processing of suppressing the noise of the generated complex number image D. FIG. 2 illustrates a vibration state image E in a state containing noise for which the noise suppression processing is not executed. Hereinafter, the details of control processing by the control unit 4 will be described.

Measurement of Interference Light by Control Unit

The control unit 4 measures the vibration state of the inspection target P by irradiating the measurement region Pa of the inspection target P in which the elastic wave is excited with the laser beams. Specifically, the control unit 4 acquires (captures) an interference light image obtained by measuring the vibration state in the measurement region Pa of the inspection target P based on an intensity pattern of the interference light captured by each detection element of the image sensor 34 while changing the phase of the laser beam by the phase shifter 35. The interference light image is an image in which a speckle pattern of the interference light is captured.

Specifically, the control unit 4 activates the phase shifter 35 disposed in the speckle shearing interferometer 3 by an actuator (not shown) to change the phase of the transmitted laser beam. As a result, for example, a phase difference between the laser beam reflected at a position Pa1 and the laser beam reflected at a position Pa2 changes. A plurality of detection elements of the image sensor 34 detect the intensity of the interference light in which these two laser beams interfere with each other.

Figure 3:
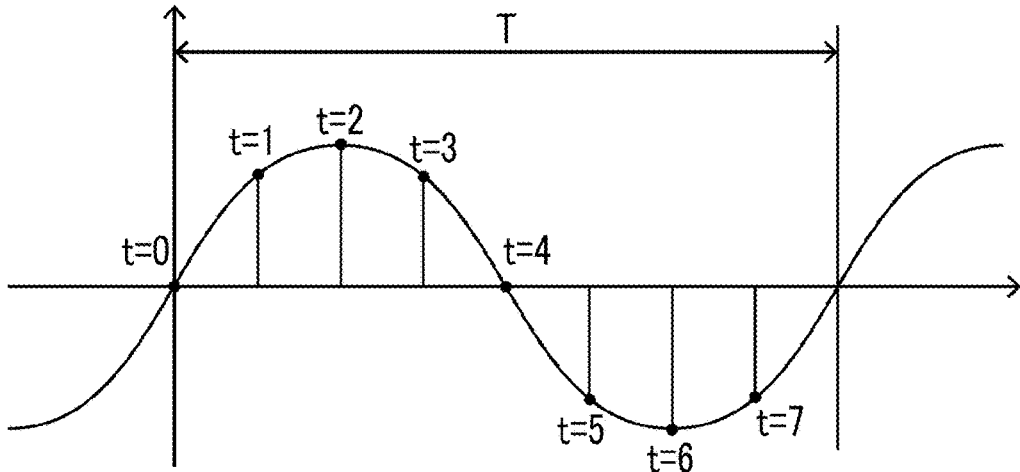
FIG. 3 is a diagram for describing a timing of measurement according to the first embodiment.
Figure 4:
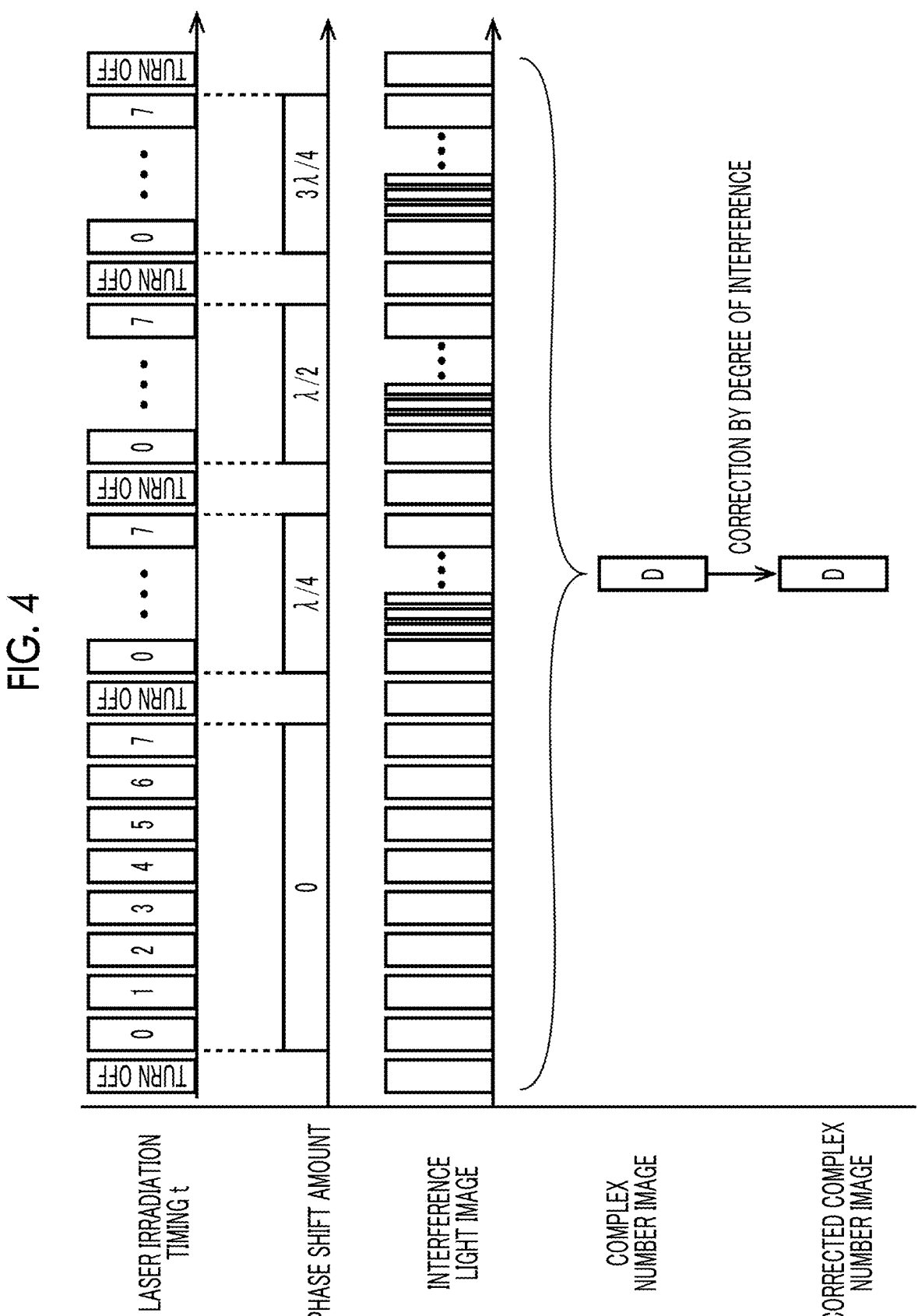
FIG. 4 is a diagram for describing the measurement of interference light and the acquisition and correction of a complex number image.

As illustrated in FIGS. 3 and 4, the control unit 4 controls the vibration of the vibrator 1 and the timing of irradiation of the laser beam irradiated by the irradiation unit 2 via the signal generator 5, and captures the interference light in each of the detection elements of the image sensor 34 while changing a phase shift amount. The control unit 4 changes the phase shift amount by $\lambda/4$, and captures a total of 37 interference light images of 32 images at timings t (t=0 to 7) at which the phase of the elastic wave is different by T/8 at phase shift amounts $(0, \lambda/4, \lambda/2, \text{and } 3\lambda/4)$ and five images during turning off before and after the phase shift amounts $(0, \lambda/4, \lambda/2, \text{and } 3\lambda/4)$. $\lambda$ is a wavelength of the laser beam. T is a period of the elastic wave excited in the inspection target P.

The control unit 4 obtains an optical phase (phase difference between the two optical paths in a case where the phase shift amount is zero) $\Phi_t$ by Equation (1) from luminance values $I_0$ to $I_3$ of four images in which the timings t (t=0 to 7) of the phase of the elastic wave are the same but the phase shift amounts of the laser beam are different by $\lambda/4$ based on the captured interference light image.

$$\Phi_t = -\arctan\{(I_3 - I_1)/(I_2 - I_0)\} \tag{1}$$

The control unit 4 obtains approximation coefficients A, $\varphi$, and C in Equation (2) by performing a sine wave approximation to the optical phase $\Phi_t$ by the least squares method.

$$\Phi_t = A\cos(\varphi + t\pi/4) + C = B\exp(t\pi/4) + C \tag{2}$$

However, B is a complex amplitude and is expressed as in Equation (3).

$$B = A\exp(i\varphi): \text{complex amplitude} \tag{3}$$

The phase shift amount and a step of the timing of irradiation of the laser beam are not limited thereto. In this case, a calculation expression is different from the above Equations (1) to (3).

The complex amplitude expressed by the above Equation (3) can be expressed as I(x)=a(x)+ib(x) from Euler's theorem. I(x) represents a state of the optical phase (vibration state of the inspection target P) based on the interference light detected by the detection element corresponding to coordinates x of the measurement region Pa in the image sensor 34 by the complex number. By doing this, in the first embodiment, the control unit 4 generates the complex number image D based on the measurement result of the interference light captured by the image sensor 34 of the speckle shearing interferometer 3. The complex number image D has a plurality of pixels disposed in a planar shape so as to correspond to the detection elements of the image sensor 34. In the complex number image D, each pixel is represented by the complex number I(x) acquired by the above Equations (1) to (3). The complex number I(x) indicates the measured vibrational state (phase and amplitude of a difference in the optical path that changes periodically). The complex number I(x) indicates the complex number of the pixel at the coordinates x of the complex number image D corresponding to the coordinates of the measurement region Pa.

Correction of Degree of Interference

Here, as illustrated in FIG. 4, the control unit 4 is configured to correct the complex number image D in accordance with a degree of interference coh(x). Specifically, in the first embodiment, the control unit 4 is configured to acquire the degree of interference coh(x) of the measured interference light. The control unit 4 is configured to correct the complex number I(x) representing each pixel by weighting the complex number I(x) representing each pixel of the complex number image D in accordance with the acquired degree of interference coh(x). coh(x) indicates the degree of interference at the coordinates x.

Specifically, the control unit 4 measures the degree of interference coh(x) in each pixel of the complex number image D based on the amount of change in the luminance values $I_0$ to $I_3$ of four images in which the timings t (t=0 to 7) of the phase of the elastic wave are same and the phase shift amounts of the laser beams are different by $\lambda/4$. That is, even though the shift amount is changed by the phase shifter 35, the pixel having a small change in the luminance values $I_0$ to $I_3$ has a value having a small degree of interference coh(x). On the other hand, in a case where the shift amount is changed by the phase shifter 35, the pixel having a large change in the luminance values $I_0$ to $I_3$ has a large degree of interference coh(x).

The control unit 4 corrects the degree of interference coh(x) of each pixel in the complex number image D by the following Equation (4).

$$I'(x) = \frac{1}{C_n} \sum_n^{N_k} I(x+n) coh^{\gamma_c}(x+n) \tag{4}$$

I'(x) is a value obtained by correcting a value of the pixel at the coordinates x. $C_n$ is a normalization term for setting a total weight to 1. $N_k$ is the number of surrounding pixels (kernel size) of a pixel of interest used for correction (pixel to be corrected), and $\gamma_c$ is a parameter for adjusting the magnitude of the influence of the degree of interference. According to the above Equation (4), the control unit 4 interpolates (corrects) the pixel having the small degree of interference coh(x) by weighting from the surrounding pixels having the large degree of interference coh(x). The control unit 4 executes the correction of the degree of interference coh(x) according to the above Equation (4) for all the pixels of the complex number image D.

Noise Suppression Processing

Then, in the first embodiment, the control unit 4 is configured to execute processing of suppressing noise of the complex number image D of which the degree of interference coh(x) is corrected. In the following description, the complex number image D and the complex number I(x) illustrate values after the correction by the above-mentioned degree of interference coh(x) is executed.

Figure 5:
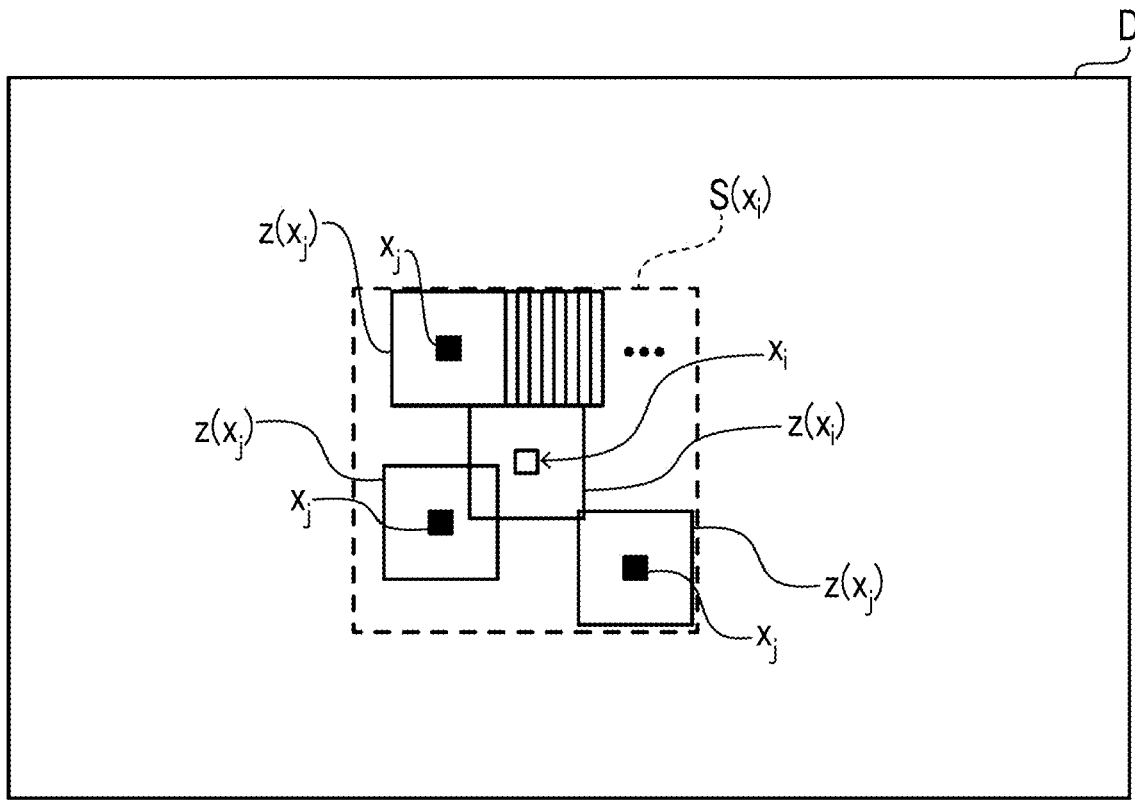
FIG. 5 is a diagram for describing the extraction of a target image region and a reference image region from the complex number image.

As illustrated in FIG. 5, in the first embodiment, the control unit 4 acquires a target image region z(x_i) defined in the acquired complex number image D and a plurality of reference image regions z(x) (j: 1 to N) defined in the complex number image D separately from the target image region $z(x_i)$. Specifically, the control unit 4 acquires the target image region $z(x_i)$ by extracting a predetermined region from the complex number image D. The control unit 4 acquires the plurality of (N) reference image regions $z(x_j)$ by extracting a plurality of predetermined regions having the same size as the target image region $z(x_i)$ from the complex number image D separately from the target image region $z(x_i)$.

The target image region $z(x_i)$ is a predetermined region including coordinates $x_i$. For example, the target image region $z(x_i)$ is a region having 7×7 pixels with the coordinates $x_i$ as a center. That is, the target image region $z(x_i)$ is a set of 49 pixels with the pixel represented by the complex number $I(x_i)$ as a center. The target image region $z(x_i)$ is a target region where the noise suppression processing is executed. The reference image region $z(x_j)$ is N different regions around the target image region $z(x_i)$. For example, the reference image region $z(x_j)$ is a region having 7×7 pixels centered on each of coordinates $x_i$ to coordinates $x_N$. That is, the reference image region $z(x_j)$ is a set of 49 pixels centered on a pixel, each represented by a complex number $I(x_j)$ (complex number $I(x_i)$ to complex number $I(x_N)$). The reference image region $z(x_i)$ is extracted from a predetermined region $S(x_i)$ centered on the coordinates $x_i$ (for example, a region including 21×21 pixels). The reference image region $z(x_j)$ may be extracted from the entire complex number image D. The reference image region $z(x_j)$ may have some pixels in common with the target image region $z(x_i)$. Similarly, among the plurality of reference image regions $z(x_j)$, different reference image regions $z(x_j)$ may have common pixels.

The control unit 4 executes the noise suppression processing on the target image region $z(x_i)$ by comparing with the plurality of reference image regions $z(x_j)$.

Specifically, in the first embodiment, the control unit 4 acquires a degree of similarity between the pixel included in the acquired target image region $z(x_i)$ and the pixel included in the plurality of reference image regions $z(x_j)$ by comparing the complex numbers $I(x)$ representing the pixels. The control unit 4 acquires a weight based on the acquired degree of similarity. The control unit 4 executes, as the noise suppression processing, non-local means processing of suppressing the noise of the target image region $z(x_i)$ by executing processing of averaging each of the plurality of reference image regions $z(x_j)$ by using the weights based on the acquired weights.

Non-Local Means Processing

Here, the control unit 4 is configured to cause the inspection system 100 to execute optimum noise suppression processing by weighting a signal distribution (noise distribution) in the non-local means processing. This weight represents a degree of similarity between each of the plurality of reference image regions $z(x_j)$ and the target image region $z(x_i)$.

Figures 6, 7:
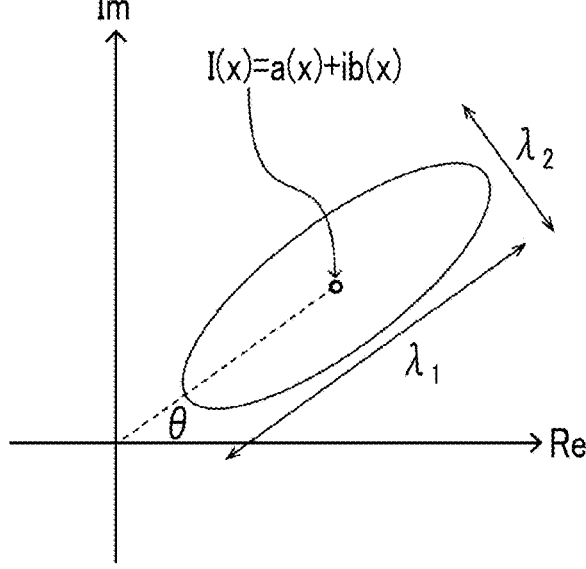
FIG. 6 is a diagram showing a noise distribution on a complex plane.
FIG. 7 is a diagram for describing an approximation of a noise distribution of signal points.

As illustrated in FIG. 6, the noise contained in the complex number image D has a peculiar noise distribution. For example, in a case where the complex number image D does not contain noise, since phases and amplitudes of vibrations in 7×7 pixels in the region containing the 7×7 pixels are substantially equal. Thus, in a case where the complex numbers $I(x)$ of the extracted pixels are plotted on a complex plane, plotted signal points are set at substantially the same point. On the other hand, in a case where the complex number image D contains noise, and in a case where the complex numbers $I(x)$ of the extracted pixels are plotted on the complex plane, the plotted signal points are diffused according to a distribution (noise distribution) having a spread.

This noise distribution greatly spreads in accordance with the intensity of the detected signal. That is, this noise distribution increases in accordance with the magnitude of an amplitude of the periodic change in the vibration state of the inspection target P in the measurement region Pa. For example, in a portion where a vibration state of the vibration state image E is an antinode, since the amplitude becomes large, the spread of the noise distribution becomes large. In the portion where the vibration state is a node, since the amplitude becomes small, the spread of the noise distribution is small.

As illustrated in FIG. 7, in the first embodiment, the control unit 4 approximates the noise distribution of the signal points of the complex numbers $I(x)$ representing the pixels of the target image region $z(x_i)$ on the complex plane such that the noise distribution is distributed according to a two-dimensional normal distribution that spreads unevenly in a signal point direction from an origin on the complex plane in accordance with the magnitude of the amplitude of the periodic change in the vibration state of the inspection target P.

Specifically, the control unit 4 approximates a distribution of actual signal points (noise distribution including noise) on the complex number image D so as to follow a normal distribution $N(u|\Sigma)$ in a case where $u=a+ib$ is a true signal point in a case where there is no noise in a certain pixel of the complex number image D. Assuming that a degree of spread from an origin in a signal point direction ($\theta$) is $\lambda_i$ and a degree of spread in an orthogonal direction orthogonal to the signal point direction is $\lambda_2$, since $u=|u|\cos\theta+i|u|\sin\theta$ is expressed in consideration with an augmented matrix that is multiplied by $\lambda_1$ times in an angle $\theta$ direction (signal point direction) and is multiplied by $\lambda_2$ times in the orthogonal direction, a covariance matrix of the normal distribution $N(u|\Sigma)$ is as expressed in the following Equation (5).

$$\sum = \begin{pmatrix} \cos\theta & -\sin\theta \\ \sin\theta & \cos\theta \end{pmatrix} \begin{pmatrix} \lambda_1 & 0 \\ 0 & \lambda_2 \end{pmatrix} \begin{pmatrix} \cos\theta & \sin\theta \\ -\sin\theta & \cos\theta \end{pmatrix} = \tag{5}$$

$$\begin{pmatrix} \lambda_1\cos\theta^2 + \lambda_2\sin\theta^2 & (\lambda_1 - \lambda_2)\cos\theta\sin\theta \\ (\lambda_1 - \lambda_2)\cos\theta\sin\theta & \lambda_1\sin\theta^2 + \lambda_2\cos\theta^2 \end{pmatrix} =$$

$$\begin{pmatrix} \lambda_1\dfrac{a^2}{|u|^2} + \lambda_2\dfrac{b^2}{|u|^2} & (\lambda_1 - \lambda_2)\dfrac{ab}{|u|^2} \\ (\lambda_1 - \lambda_2)\dfrac{ab}{|u|^2} & \lambda_1\dfrac{b^2}{|u|^2} + \lambda_2\dfrac{a^2}{|u|^2} \end{pmatrix}$$

The control unit 4 approximates the noise distribution so as to be distributed according to the two-dimensional normal distribution that spreads unevenly in the signal point direction in accordance with the magnitude of the amplitude by defining $\lambda_1$ and $\lambda_2$ as shown in the following Equation (6).

$$\lambda_1 = n_c + |u|^\gamma n_r \tag{6}$$
$$\lambda_2 = n_c$$

Here, $n_c$ is a parameter indicating the magnitude of signal-independent noise that spreads isotropically, $n_r$ is a parameter indicating the magnitude of signal-dependent noise that spreads unevenly in the signal point direction from the origin, and $\gamma$ is a parameter indicating a degree of dependence with respect to an amplitude of a signal point.

In the first embodiment, the control unit 4 is configured to acquire the degree of similarity between the pixels included in the target image region $z(x_i)$ and the pixels included in the reference image region $z(x_j)$ based on the approximated noise distribution by performing the following arithmetic processing and execute the noise suppression processing.

Specifically, in a case where the noise of the target image region $z(x_i)$ is suppressed, assuming that a region including true values in a case where there is no noise in the pixels in the target image region $z(x_i)$ is $u(x_i)$ and a region (region after noise suppression) in which noise is estimated to be suppressed in the pixels in the target image region $z(x_i)$ is $u'(x_i)$, optimum estimation is acquired by minimizing an expected loss after the fact as represented in Equation (7).

$$E\big[L\big(u(x_i),u'(x_i)\big)\big] = \sum_{u(x_i)} L\big(u(x_i),u'(x_i)\big)p\big(u(x_i)|z(x_i)\big) \qquad (7)$$

$p(x_i)|z(x_i))$ is a conditional probability distribution of $u(x_i)$ in a case where $z(x_i)$ is observed. From the above Equation (7), assuming that a loss function L is a squared error, an optimum estimated value $u'(x_i)_{opt}$ of $u'(x_i)$ can be expressed by Equation (8).

$$u'(x_i)_{opt} =$$
$$\mathrm{argmin}_{u'(x_i)}\sum_{u(x_i)}\|u(x_i)-u'(x_i)\|^2\,p\big(u(x_i)|z(x_i)\big) = \sum_{u(x_i)} u(x)p\big(u(x_i)|z(x_i)\big) \qquad (8)$$

Equation (8) can be rewritten by Bayes' theorem and can be expressed in Equation (9).

$$u'(x_i)_{opt} = \sum_{u(x_i)} u(x_i)\frac{p(u(x_i),z(x_i))}{p(z(x_i))} = \frac{\sum_{u(x_i)} u(x_i)p\big(z(x_i)|u(x_i)\big)p(u(x_i))}{\sum_{u(x_i)} p\big(z(x_i)|u(x_i)\big)p(u(x_i))} \qquad (9)$$

Here, $p(z(x_i)|u(x_i))$ is a conditional probability distribution of $z(x_i)$ in a case where the true value is $u(x_i)$, and $p(u(x_i))$ is a prior distribution of $u(x_i)$.

Since $p(z(x_i)|u(x_i))$ and $p(u(x_i))$ cannot measure accurate values, the control unit 4 acquires the complex number $I(x_j)$ representing each pixel in the reference image region $z(x_j)$ extracted from the surrounding region of the target image region $z(x_i)$. Assuming that the prior distribution $p(u(x_i))$ follows a uniform distribution, $u'(x_i)$ can be approximated from Equation (9) to Equation (10).

$$u'(x_i) \approx \frac{\sum_{j=1}^{N} u(x_j)p\big(z(x_i)|u(x_j)\big)}{\sum_{j=1}^{N} p\big(z(x_i)|u(x_j)\big)} \approx \frac{\sum_{j=1}^{N} z(x_j)p\big(z(x_i)|z(x_j)\big)}{\sum_{j=1}^{N} p\big(z(x_i)|z(x_j)\big)} \qquad (10)$$

As represented in Equation (10), the control unit 4 is configured to approximate $u'(x_i)$ by using an actually measured value (complex number $I(x_j)$) of each pixel in a plurality of (N) reference image regions $z(x_j)$ instead of $u(x_j)$ which is an unknown value.

In a case where each of the n pixels included in the target image region $z(x_i)$ is expressed as $z(x_{i,k})$, (k: 1 to n) and n pixels included in the reference image region $z(x_j)$ is expressed as $z(x_j, k)$, (k: 1 to n), the approximation is performed such that $z(x_{i,k})|z(x_{j,k})$ follows a normal distribution $N(z(x_{i,k})|\Sigma)$. Assuming that $p(z(x_{i,k})|z(x_{j,k}))$ is expressed in Equation (11).

$$p\big(z(x_i)\,|\,z(x_j)\big) = \prod_{k=1}^{n} p\big(z(x_{i,k})\,|\,z(x_{j,k})\big) \qquad (11)$$

k is a numerical value indicating relative coordinates of the pixel in each of the target image region $z(x_i)$ and the reference image region $z(x_j)$. In a case where the target image region $z(x_i)$ and the reference image region $z(x_j)$ have 7×7 pixels (in the case of n=49), k=1 to 49.

The control unit 4 approximates the noise distribution of the signal points so as to follow the normal distribution of the covariance matrix $\Sigma$ represented in Equation (5) by the above arithmetic processing, and executes the noise suppression processing for the reference image region z(xi) by the arithmetic processing represented in Equations (12) to (14).

$$u'(x_i) = \frac{\sum_{j=1}^{N} z(x_j)\prod_{k=1}^{n} p\big(z(x_{i,k})|z(x_{j,k})\big)}{\sum_{j=1}^{N}\prod_{k=1}^{n} p\big(z(x_{i,k})|z(x_{j,k})\big)} \qquad (12)$$

$$p\big(z(x_{i,k})|z(x_{j,k})\big) = \qquad (13)$$

$$\exp\Bigg(-\frac{1}{2\bigg(1-\frac{\sum(x_{j,k})_{0,1}^2}{\sum(x_{j,k})_{0,0}\sum(x_{j,k})_{1,1}}\bigg)}\Bigg.$$

$$\left[\frac{(a(x_{i,k})-a(x_{j,k}))^2}{\sum(x_{j,k})_{0,0}}+\frac{(b(x_{i,k})-b(x_{j,k}))^2}{\sum(x_{j,k})_{1,1}}-\right.$$

$$\left.\left.\frac{2\sum(x_{j,k})_{0,1}}{\sum(x_{j,k})_{0,0}\sum(x_{j,k})_{1,1}}(a(x_{i,k})-a(x_{j,k}))(b(x_{i,k})-b(x_{j,k}))\right]\right)$$

$$\sum(x_{j,k}) = \begin{pmatrix}\sum(x_{j,k})_{0,0} & \sum(x_{j,k})_{0,1}\\ \sum(x_{j,k})_{1,0} & \sum(x_{j,k})_{1,1}\end{pmatrix} = \frac{1}{|z(x_{j,k})|^2} \qquad (14)$$

$$\begin{pmatrix}(n_c+|z(x_{j,k})|^\gamma n_r)a(x_{j,k})^2 + & |z(x_{j,k})|^\gamma n_r a(x_{j,k})b(x_{j,k})\\ \quad n_c b(x_{j,k})^2 & \\ |z(x_{j,k})|^\gamma n_r a(x_{j,k})b(x_{j,k}) & (n_c+|z|^\gamma n_r)b(x_{j,k})^2 +\\ & n_c a(x_{j,k})^2\end{pmatrix}$$

In the above Equations (12) to (14), $p(z(x_{j,k})|z(x_{j,k}))$ is a value representing a weight based on the degree of similarity between the target image region $z(x_i)$ and each of the plurality of reference image regions $z(x_i)$. The control unit 4 is configured to use $p(z(x_{j,k})|z(x_{j,k}))$ as a weight in a case where the plurality of reference image regions $z(x_i)$ are averaged. As represented in Equation (13), in $p(z(x_{j,k})|z(x_{j,k}))$, a degree of similarity is calculated by using, as the comparison result, differences between a real part $a(x_{j,k})$ and an imaginary part $b(x_{j,k})$ of the complex number $I(x_{j,k})$ in each pixel $(z(x_{j,k}))$ of the target image region $z(x_i)$ and a real part $a(x_{j,k})$ and an imaginary part $b(x_{j,k})$ of the complex number $I(x_{j,k})$ in each pixel $(z(x_{j,k})$ of the plurality of reference image region $z(x_j)$.

The control unit 4 acquires $u'(x_i)$ which is the region (region after noise suppression) in which the noise is estimated to be suppressed by weighting each of the plurality of reference image regions $z(x_j)$ by using the weight $p(z(x_{i,\ k})|z(x_{j,\ k}))$ expressed by Equation (13) and averaging the weights. The control unit 4 executes the noise suppression processing for the target image region $z(x_i)$ by acquiring the acquired $u'(x_i)$ as the target image region $z(x_i)$ in which the noise is suppressed.

The control unit 4 is configured to suppress the noise of the entire complex number image D by sequentially extracting (defining) the target image region $z(x_i)$ for the entire complex number image D and executing the same noise suppression processing for the sequentially extracted target image region $z(x_i)$.

Generation of Vibration State Image

Figure 8:
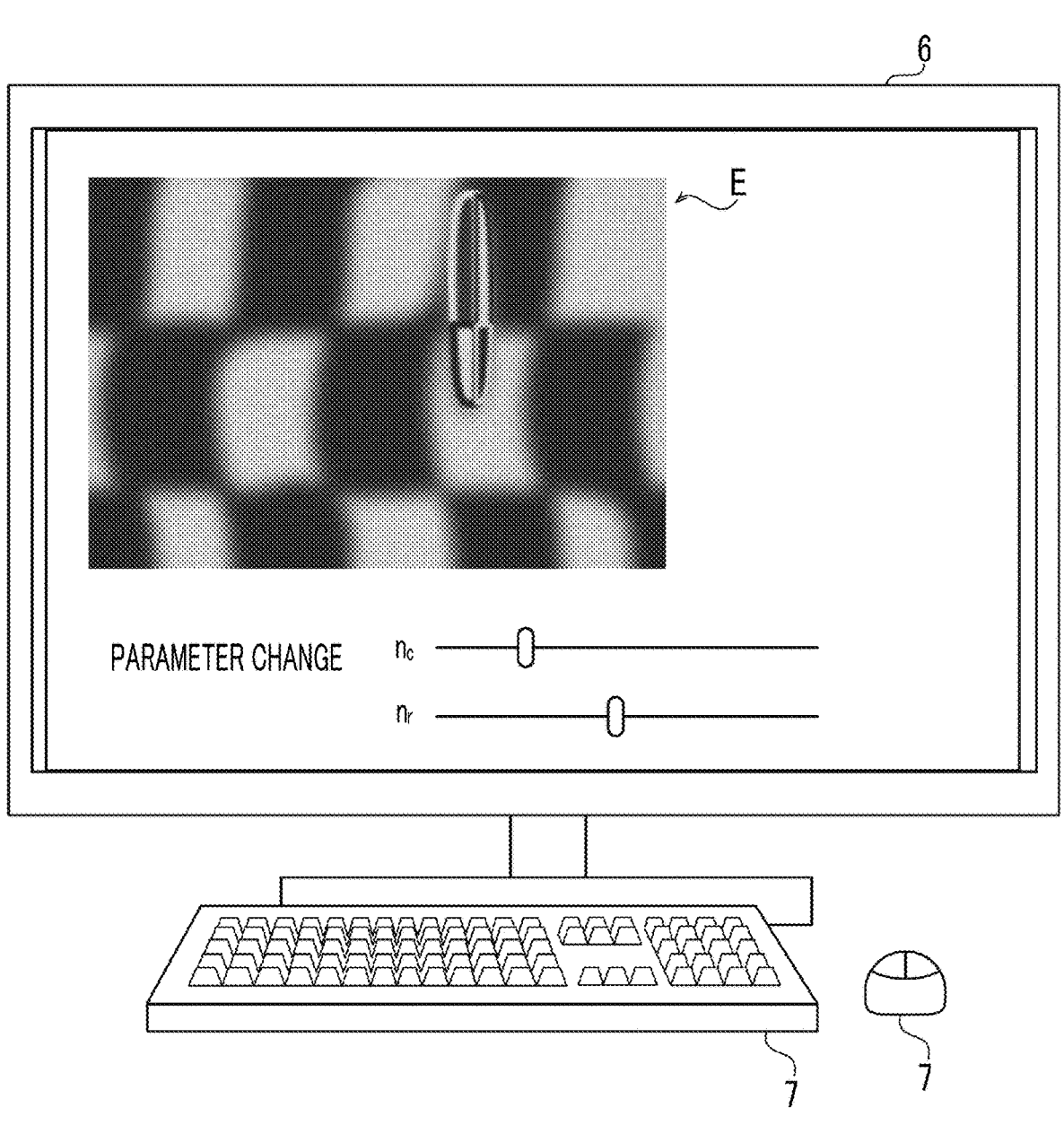
FIG. 8 is a schematic diagram showing the display of a display unit according to the first embodiment.

As illustrated in FIG. 8, in the first embodiment, the control unit 4 is configured to generate the vibration state image E on which the vibration state of the inspection target P in the measurement region Pa is visually recognizable based on the complex number image D in which the noise is suppressed by executing the noise suppression processing. For example, the control unit 4 generates the vibration state image E as a moving image by converting the real part into a time-series image from the complex number $I(x)$ of each pixel of the complex number image D in which the noise is suppressed while rotating the phase. The control unit 4 may acquire an amplitude or a phase of the complex number $I(x)$ of each pixel of the complex number image D in which the noise is suppressed as a real value, and may generate the vibration state image E as one still image by using the amplitude or phase acquired as the real value as a luminance value. The control unit 4 displays the vibration state image E on the display unit 6 such that a discontinuous region in the vibration state is visually recognizable as the defect Q (defective portion) occurring inside the inspection target P. FIG. 8 shows a state where the noise is suppressed from the vibration state image E in FIG. 2.

Parameter Change

In the first embodiment, the control unit 4 is configured to change the parameters $n_c$, and $n_r$ indicating degrees of spread of the distribution in a case where the noise distribution is approximated and the parameters $n_c$ and $n_r$ among the parameters γ. Specifically, the operation unit 7 receives an input operation for changing the parameters $n_c$ and $n_r$ by the inspection worker who visually recognizes the vibration state image E displayed on the display unit 6. The control unit 4 is configured to be able to adjust a spread state of the two-dimensional normal distribution in a case where the noise distribution is approximated in the noise suppression processing by changing the parameters $n_c$ and $n_r$ based on the input operation received by the operation unit 7.

In the first embodiment, the control unit 4 is configured to store the comparison result obtained by comparing the complex numbers $I(x)$ representing the pixels included in each of the target image region $z(x_i)$ and the plurality of reference image regions $z(x_j)$. For example, as represented in Equation (13), the difference between the real parts $a(x)$ and the difference between the imaginary parts $b(x)$ of the complex numbers $I(x)$ representing the pixels included in each of the target image region $z(x_i)$ and the reference image region $z(x_j)$ do not change even though the parameters $n_c$ and $n_r$ are changed. The control unit 4 is configured to store the arithmetic result such as the above comparison result which does not change even though where the parameters $n_c$ and $n_r$ are changed, in the storage device, in a case where the processing of suppressing the noise of the complex number image D is first executed.

In the first embodiment, the control unit 4 is configured to re-acquire the degree of similarity by approximating the noise distribution again in a state where the spread state of the two-dimensional normal distribution is adjusted by using the changed parameters $n_c$ and $n_r$ and the stored comparison result in a case where an operation for changing the parameters $n_c$ and $n_r$ indicating the degrees of spread of the distribution is received by the operation unit 7 after the noise suppression processing is executed once, and re-acquire the weight $p(z(x_{i,\ k})|z(x_{j,\ k}))$ used for the noise suppression processing (non-local means processing) by the above Equation (13). The noise suppression processing is re-executed by using the acquired weight $p(z(x_{i,\ k})|z(x_{j,\ k}))$.

About Defect Inspection Method

Next, an image processing method by the inspection system 100 according to the first embodiment will be described with reference to FIG. 9. The image processing method of the first embodiment is executed by the control processing by the control unit 4.

First, in step 401, the complex number image D on which the pixels are represented by the complex number $I(x)$ indicating the periodic change in the vibration state of the inspection target P in the measurement region Pa is acquired based on the measurement result by the speckle shearing interferometer 3.

Subsequently, in step 402, the target image region $z(x_i)$ defined in the acquired complex number image D and the plurality of reference image regions $z(x_j)$ partitioned in the complex number image D separately from the target image region $z(x_i)$ are acquired.

Subsequently, in step 403, the degree of similarity between the pixel included in the acquired target image region $z(x_i)$ and the pixel included in the plurality of reference image regions $z(x_j)$ are acquired by comparing the complex numbers $I(x)$ representing the pixels. Specifically, the degree of similarity between the target image region $z(x_i)$ and the reference image region $z(x_j)$ is acquired by acquiring, as the comparison result, the differences between the real parts $a(x)$ and the imaginary parts $b(x)$ of the complex numbers $I(x)$ representing the pixels having the same relative coordinates among the pixels included in each of the target image region $z(x_i)$ and the reference image region $z(x_j)$. j=1 to N. The acquired comparison result is stored.

Subsequently, in step 404, the weight $p(z_{i,\ k})|z(x_{j,\ k}))$ for weighting the plurality of reference image regions $z(x_j)$ is acquired based on the acquired degree of similarity.

Subsequently, in step 405, the noise suppression processing is executed for the target image region $z(x_i)$ based on the acquired weight $p(z_{i,\ k})|z(x_{j,\ k}))$. Specifically, the target image region $z(x_i)$ ($u'(x_i)$ of Equation (12)) on which the noise suppression processing is executed is acquired by weighting the plurality of reference image regions $z(x_j)$ by using the acquired weight $p(z(x_{i,\ k})|z(x_{j,\ k}))$ and averaging the weights.

Subsequently, in step 406, the noise of the complex number image D is suppressed by executing the noise suppression processing of the target image region $z(x_i)$.

Subsequently, in step 407, the vibration state image E on which the vibration state of the inspection target P in the measurement region Pa is visually recognizable is generated based on the complex number image D in which the noise is suppressed. The generated vibration state image E is displayed on the display unit 6.

Subsequently, in step 408, it is determined whether or not the operation unit 7 receives the input operation for changing the parameters $n_c$ and $n_r$ indicating the degrees of spread of the distribution in a case where the noise distribution is approximated and the parameters $n_c$ and $n_r$ among the parameters γ. In a case where it is determined that the input operation for changing the parameters $n_c$ and $n_r$ are received, the processing proceeds to step 409. In a case where it is not determined that the input operation for changing the parameters $n_c$ and $n_r$ are received, the control processing is ended.

In step 409, the parameters $n_c$ and $n_r$ are changed based on the input operation received by the operation unit 7. The degree of similarity is re-calculated by using the changed parameters $n_c$ and $n_r$ and the comparison result stored in step 403, and the processing returns to step 404. By re-executing steps 404 to 407, the noise suppression processing of the complex number image D using the changed parameters $n_c$ and $n_r$ is re-executed, and the vibration state image E is re-generated and displayed on the display unit 6.

Effects of First Embodiment

In the first embodiment, the following effects can be obtained.

In the inspection system 100 of the first embodiment, as described above, the degree of similarity between the pixel included in the target image region $z(x_i)$ defined in the complex number image D and the pixel included in the plurality of reference image regions $z(x_j)$ defined in the complex number image D separately from the target image region $z(x_i)$ is acquired by comparing the complex numbers I(x) representing the pixels. The noise suppression processing of the target image region $z(x_i)$ is executed by using the weight $p(z(x_{i, k})|z(x_{j, k}))$ based on the acquired degree of similarity. As a result, the noise of the complex number image D can be suppressed by executing the noise suppression processing of the target image region $z(x_i)$ defined in the complex number image D. Thus, since the complex number image D on which the pixels are represented by the complex number I(x) indicating the periodic change in the state reflects the periodic change in the vibration state, unlike a case where the noise suppression processing is executed for the image represented by the real value, the noise can be effectively suppressed even though the noise state changes in accordance with the vibration state by suppressing the noise of the complex number image D. As a result, noise can be effectively suppressed even though the periodic change in the state is measured.

In the first embodiment, further effects can be obtained by the following configurations.

That is, in the first embodiment, as described above, the control unit 4 (image processing unit) is configured to approximate the noise distribution of the signal points on the complex number I(x) representing the pixel of the target image region $z(x_i)$ on the complex plane such that the noise distribution is distributed according to the two-dimensional normal distribution that spreads unevenly in the signal point direction from the origin on the complex plane in accordance with the magnitude of the amplitude of the periodic change in the vibration state of the inspection target P, and acquire the degree of similarity based on the approximated distribution. With this configuration, even though the noise distribution spreads unevenly on the complex plane, the noise distribution can be approximated so as to correspond to an actual uneven spread of the noise by being approximated according to the two-dimensional normal distribution that spreads unevenly in the signal point direction from the origin on the complex plane. Thus, in a case where the noise distribution spreads unevenly on the complex plane, the degree of similarity can be calculated more appropriately. As a result, the noise can be suppressed more effectively in the noise processing by using the weight $p(z(x_{i, k})|z(x_{j, k}))$ based on the degree of similarity.

In the first embodiment, as described above, the inspection system 100 includes the operation unit 7 that receives the operation of changing the parameters $n_c$ and $n_r$ indicating the degrees of spread of the distribution in a case where the noise distribution is approximated. With this configuration, the inspection worker can easily perform an operation of adjusting the degree of spread of the noise distribution. Thus, a degree of suppression of the noise in the complex number image D can be easily adjusted.

In the first embodiment, as described above, the control unit 4 (image processing unit) is configured to store the comparison result obtained by comparing the complex numbers I(x) representing the pixels included in each of the target image region $z(x_i)$ and the plurality of reference image regions $z(x_j)$, and acquire the degree of similarity by using the changed parameters $n_c$ and $n_r$ indicating the degrees of spread of the distribution in a case where the operation of changing the parameters $n_c$ and $n_r$ indicating the degrees of spread of the distribution and the stored comparison result is received. With this configuration, a value of the comparison result obtained by comparing the complex numbers I(x) representing the pixels included in each of the target image region $z(x_i)$ and the plurality of reference image regions $z(x_j)$ does not change even though the parameters $n_c$ and $n_r$ indicating the degrees of spread of the distribution are changed. Thus, the comparison result once calculated is stored, in a case where the parameters $n_c$ and $n_r$ indicating the degrees of spread of the distribution change, a time required to re-execute the processing of suppressing the noise of the complex number image D can be shortened.

In the first embodiment, as described above, the control unit 4 (image processing unit) is configured to execute, as the noise suppression processing, the non-local means processing of suppressing the noise of the target image region $z(x_i)$ by averaging the plurality of reference image regions $z(x_j)$ by using the weight $p(z(x_{i, k})|z(x_{j, k}))$ based on the acquired degree of similarity. With this configuration, since the non-local means processing that simply averages the reference image regions $z(x_j)$ by using the weight $p(z(x_{i, k})|z(x_{j, k}))$ based on the degree of similarity is used, the noise of the target image region $z(x_i)$ can be easily suppressed as compared with the case where processing of providing a threshold value for the acquired weight $p(z(x_{i, k})|z(x_{j, k}))$ or the like is performed.

In the first embodiment, as described above, the inspection system 100 includes the irradiation unit 2 that irradiates the inspection target P in which the elastic wave is excited by the vibrator 1 (excitation unit) with the laser beams. The speckle shearing interferometer 3 (measurement unit) is configured to cause the reflected laser beam which is the laser beam emitted by the irradiation unit 2 and reflected by the inspection target P and the reference laser beam which is the laser beam emitted by the irradiation unit 2 to interfere with each other and capture and measure the interference light obtained by causing the reflected laser beam and the reference laser beam to interfere with each other, and the control unit 4 (image processing unit) is configured to suppress the noise of the complex number image D generated based on the measurement result of the captured interference light. With this configuration, since the measured interference light of the laser beam changes periodically due to the vibration of the elastic wave, the measurement result is represented by the complex number image D and the noise is suppressed. Thus, a noise component included in the measurement result can be effectively suppressed.

In a case where the inspection target P in which the elastic wave is excited is irradiated with the laser beams, the noise distribution of the signal points of the complex number $I(x)$ representing the pixels of the complex number image D on the complex plane is distributed so as to spread unevenly due to a change in an irradiation angle of the laser beam with respect to the surface of the inspection target P by the vibration of the elastic wave or a change in the speckle pattern caused by the displacement of the surface of the inspection target P. Thus, as in the first embodiment, the complex number image D is generated based on the measurement result of the interference light, and the noise distribution of the signal points is approximated so as to be distributed according to the two-dimensional normal distribution that spreads unevenly in the signal point direction in accordance with the magnitude of the amplitude. Accordingly, the noise can be suppressed so as to correspond to the noise distribution peculiar to the complex number image D generated based on the measurement result of the interference light.

In the first embodiment, as described above, the control unit 4 (image processing unit) is configured to acquire the degree of interference $coh(x)$ of the measured interference light, and correct the complex number $I(x)$ representing each pixel by weighting the complex number $I(x)$ representing each pixel of the complex number image D in accordance with the acquired degree of interference $coh(x)$. Here, in the pixel having the small degree of interference $coh(x)$, the measured vibration state becomes an inaccurate value. Thus, in a case where the degree of similarity is calculated in a state where the complex number $I(x)$ representing the pixel having the small degree of interference $coh(x)$ is included, the accuracy of the noise suppression processing deteriorates. By contrast, in the first embodiment, the control unit 4 is configured to acquire the measured degree of interference $coh(x)$ of the interference light, and correct the complex number $I(x)$ representing each pixel by weighting the complex number $I(x)$ representing each pixel of the complex number image D in accordance with the acquired degree of interference $coh(x)$. With this configuration, the complex number is corrected so as to decrease the weight of the complex number $I(x)$ representing the pixel having the small degree of interference $coh(x)$, and thus, the performing of the processing of suppressing the noise by using the complex number $I(x)$ of the inaccurate value can be prevented. As a result, even though the complex number image D includes the pixel having the small degree of interference $coh(x)$, it is possible to suppress the deterioration in the accuracy of the noise suppression processing.

In the first embodiment, as described above, the control unit 4 (image processing unit) is configured to generate the vibration state image E on which the vibration state of the inspection target P is visually recognizable based on the complex number image D in which the noise is suppressed by executing the noise suppression processing. With this configuration, since the noise in the generated vibration state image E can be suppressed, the inspection worker can easily recognize the distribution of the vibration state of the inspection target P by visually recognizing the generated vibration state image E. Thus, in a case where the defect Q of the inspection target P is inspected, since the continuity of the vibration state in the inspection target P can be recognized by visually recognizing the vibration state image E, the defect Q in the inspection target P can be easily recognized.

Effects of Image Processing Method According to First Embodiment

The image processing method of the first embodiment can obtain the following effects.

In the image processing method of the first embodiment, with this configuration, the degree of similarity between the pixel included in the target image region $z(x_i)$ defined in the complex number image D and the pixel included in the plurality of reference image regions $z(x_j)$ defined in the complex number image D separately from the target image region $z(x_i)$ are acquired by comparing the complex numbers $I(x)$ representing the pixels. The noise suppression processing of the target image region $z(x_i)$ is executed by using the weight $p(z(x_{i,\ k})|z(x_{j,\ k}))$ based on the acquired degree of similarity. As a result, the noise of the complex number image D can be suppressed by executing the noise suppression processing of the target image region $z(x_i)$ defined in the complex number image D. Thus, since the complex number image D on which the pixels are represented by the complex number $I(x)$ indicating the periodic change in the state reflects the periodic change in the vibration state, unlike a case where the noise suppression processing is executed for the image represented by the real value, the noise can be effectively suppressed even though the noise state changes in accordance with the vibration state by suppressing the noise of the complex number image D. As a result, it is possible to provide the image processing method capable of effectively suppressing the noise even though the periodic change in the state is measured.

Second Embodiment

Next, a configuration of an inspection system 200 according to a second embodiment of the present invention will be described with reference to FIGS. 10 and 11. In this second embodiment, a background component of a vibration state image E is suppressed by removing a low frequency component. The same configuration as that of the first embodiment is shown with the same reference signs in the drawings, and the description thereof will be omitted.

Figure 10:
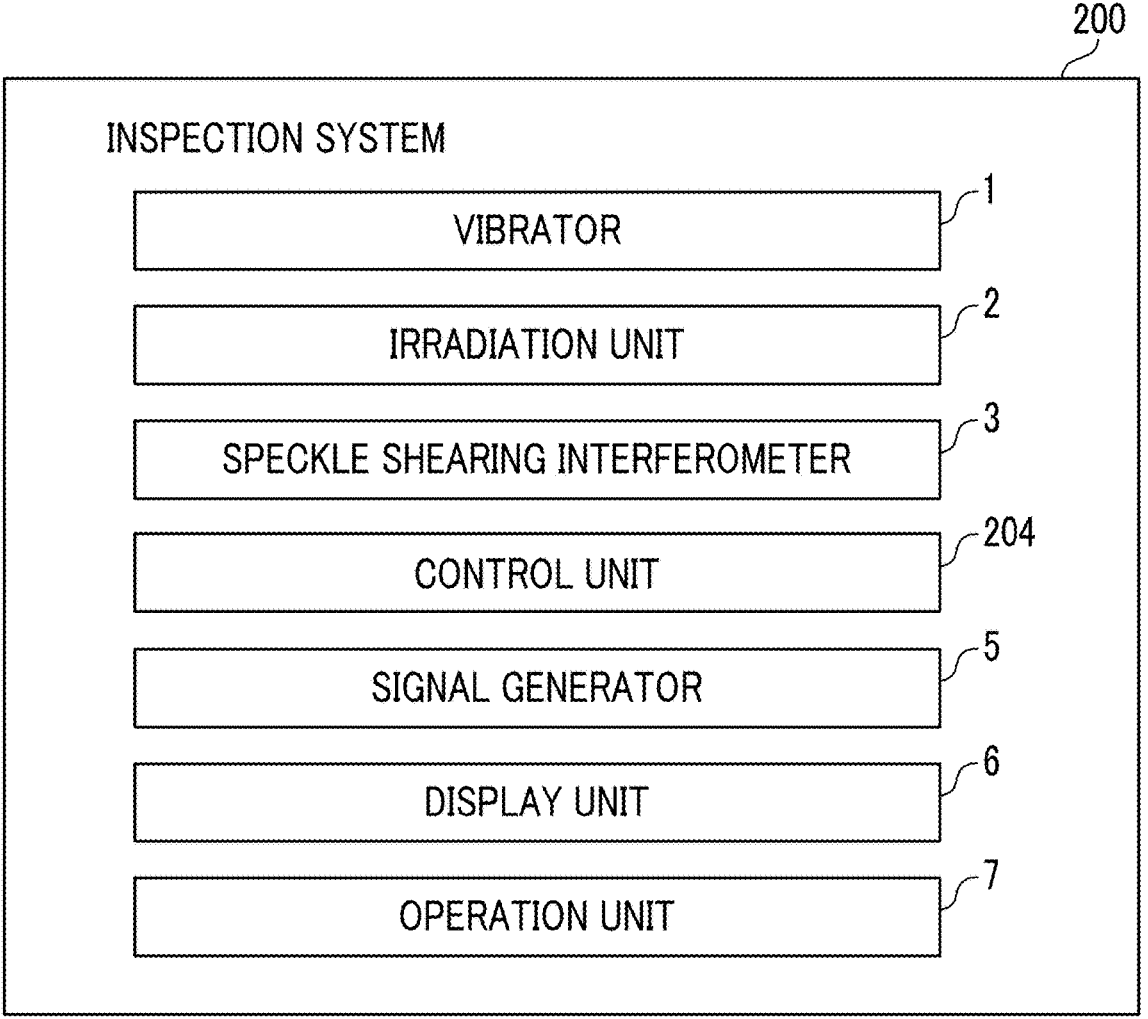
FIG. 10 is a block diagram showing a configuration of an inspection system according to a second embodiment.

As illustrated in FIG. 10, the inspection system 200 according to the second embodiment includes a control unit 204. The measurement of interference light by a speckle shearing interferometer 3 according to the second embodiment is the same as that of the first embodiment. The control unit 204 generates a complex number image D based on the measurement result by the speckle shearing interferometer 3 by the same control processing as the control unit 4 of the first embodiment. The control unit 204 is an example of an "image processing unit" within the claims.

Figure 11:
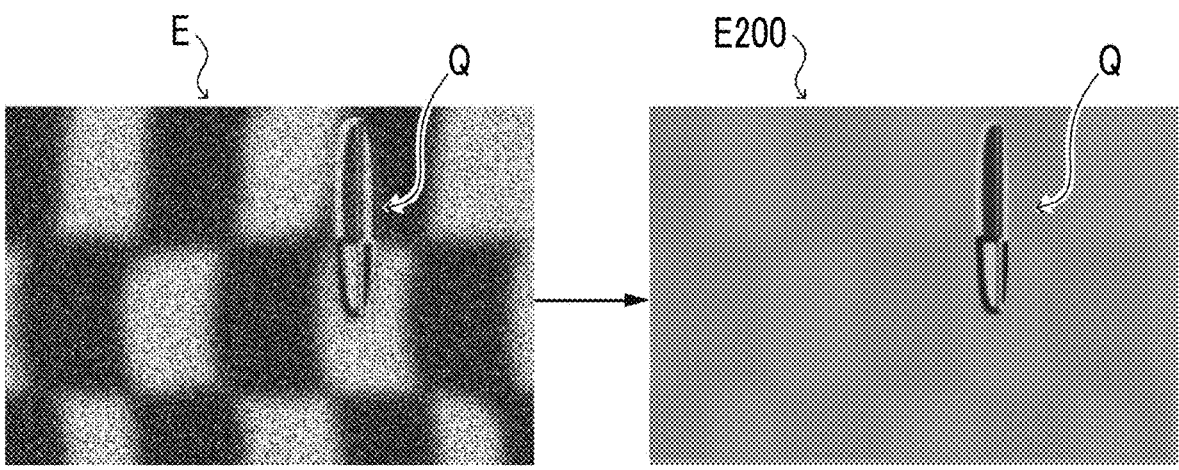
FIG. 11 is a diagram showing a vibration state image in which a low frequency component is removed and noise is suppressed.

As illustrated in FIG. 11, in the vibration state image E generated based on the complex number image D, the vibration state changes sharply (the frequency is large) in the vicinity of the defect Q, but in a background portion other than the defect Q, the vibration state changes relatively gently (the frequency is small). Thus, in the second embodiment, the control unit 204 is configured to generate a vibration state image E200 in which a low frequency component is removed and noise is suppressed.

Specifically, similarly to the control unit 4 of the first embodiment, the control unit 204 acquires a target image region $z(x_i)$ and a plurality of reference image regions $z(x_j)$ (j: 1 to N) from the generated complex number image D. Similarly to the control unit 4 of the first embodiment, the control unit 204 acquires a weight $p(z(x_{i,\,k})|z(x_{j,\,k}))$ for weighting the plurality of reference image regions $z(x_j)$ in order to suppress the noise of the target image region $z(x_i)$ (see Equation (13)).

The control unit 204 executes processing of removing the low frequency component for the plurality of reference image regions $z(x_j)$. The control unit 204 executes as the processing of removing the low frequency component, for example, low-cut filter processing using a Fourier transform on the reference image region $z(x_j)$.

In the second embodiment, the control unit 204 is configured to execute, as the noise suppression processing, the non-local means processing of suppressing the noise of the target image region $z(x_i)$ by averaging a plurality of reference image regions $z_{lowcut}(x_j)$ in which the low frequency components are removed by using the weight $p(z(x_{i,\,k})|z(x_{j,\,k}))$ based on the acquired degree of similarity.

That is, the control unit 204 acquires $u_{lowcut}'(x_i)$ which is the target image region $z(x_i)$ in which the noise is suppressed and the low frequency component is removed by weighting and averaging the plurality of reference image regions $z_{lowcut}(x_j)$ after the low frequency component is removed by using the weight $p(z(x_{i,\,k})|z(x_{j,\,k}))$ acquired based on the degree of similarity between the plurality of reference image regions $z(x_j)$ before the low frequency component is removed and the target image region $z(x_i)$. The $u_{lowcut}'(x_i)$ is expressed in the following Equation (15) by substituting $z_{lowcut}(x_j)$ into Equation (12).

$$u_{lowcut}'(x_i) = \frac{\sum_{j=1}^{N} z_{lowcut}(x_j) p(z(x_i)|z(x_j))}{\sum_{j=1}^{N} p(z(x_i)|z(x_j))} \quad (15)$$

The control unit 204 suppresses the noise in the complex number image D and removes the background component (low frequency component) based on the target image region $z(x_i)$ in which the noise is suppressed and the low frequency component is removed. The control unit 204 generates the vibration state image E200 in which the low frequency component is removed and the noise is suppressed based on the complex number image D in which the low frequency component is removed and the noise is suppressed by the same processing as in the first embodiment. Other configurations of the second embodiment are the same as those of the first embodiment.

Effects of Second Embodiment

In the second embodiment, the following effects can be obtained.

In the second embodiment, as described above, the control unit 204 (image processing unit) is configured to execute, as the noise suppression processing, the non-local means processing of suppressing the noise of the target image region $z(x_i)$ by removing the low frequency components of the plurality of reference image regions $z(x_j)$ and averaging the plurality of reference image regions $z_{lowcut}(x_j)$ in which the low frequency components are removed by using the weight $p(z(x_{i,\,k})|z(x_{j,\,k}))$ based on the acquired degree of similarity. Here, in a case where the low frequency component is included as the background component in the complex number image D, the degree of similarity is acquired in a state where the low frequency component is removed in advance and the weight is calculated. Thus, since an accurate degree of similarity cannot be acquired, a noise suppression effect is reduced. In a case where the low frequency component is removed after the noise suppression processing is executed, a high frequency component (artifact) generated by the non-local means processing that is not noticeable before the low frequency component is removed is emphasized. By contrast, in the second embodiment, the control unit 204 is configured to execute, as the noise suppression processing, the non-local means processing of suppressing the noise of the target image region $z(x_i)$ by removing the low frequency components of the plurality of reference image regions $z(x_j)$ and averaging the plurality of reference image regions $z_{lowcut}(x_j)$ in which the low frequency components are removed by using the weight $p(z(x_{i,\,k})|z(x_{j,\,k}))$ based on the acquired degree of similarity. With this configuration, in a case where the low frequency component is included as the background component in the complex number image D, the low frequency component is not removed in a case where the weight $p(z(x_{i,\,k})|z(x_{j,\,k}))$ is calculated based on the degree of similarity, and the reference image regions $z_{lowcut}(x_j)$ in which the low frequency component is removed are weighted and averaged in a case where the reference image regions are averaged by using the calculated weight $p(z(x_{i,\,k})|z(x_{j,\,k}))$. Thus, it is possible to remove the low frequency components while the deterioration in the accuracy is suppressed in a case where the weight $p(z(x_{i,\,k})|z(x_{j,\,k}))$ is calculated, and it is possible to suppress the emphasis of the high frequency component generated by the non-local means processing. As a result, in a case where the low frequency component is included as the background component in the complex number image D, the noise can be effectively suppressed while the background component is removed.

Other effects of the second embodiment are the same as those of the first embodiment.

Third Embodiment

Next, a configuration of an inspection system 300 according to a third embodiment of the present invention will be described with reference to FIGS. 12 and 13. In this third embodiment, an average value is used in a case where each pixel of the target image region $z(x_i)$ is compared with each pixel of the reference image region $z(x_j)$. The same configuration as that of the first embodiment is shown with the same reference signs in the drawings, and the description thereof will be omitted.

Figure 12:
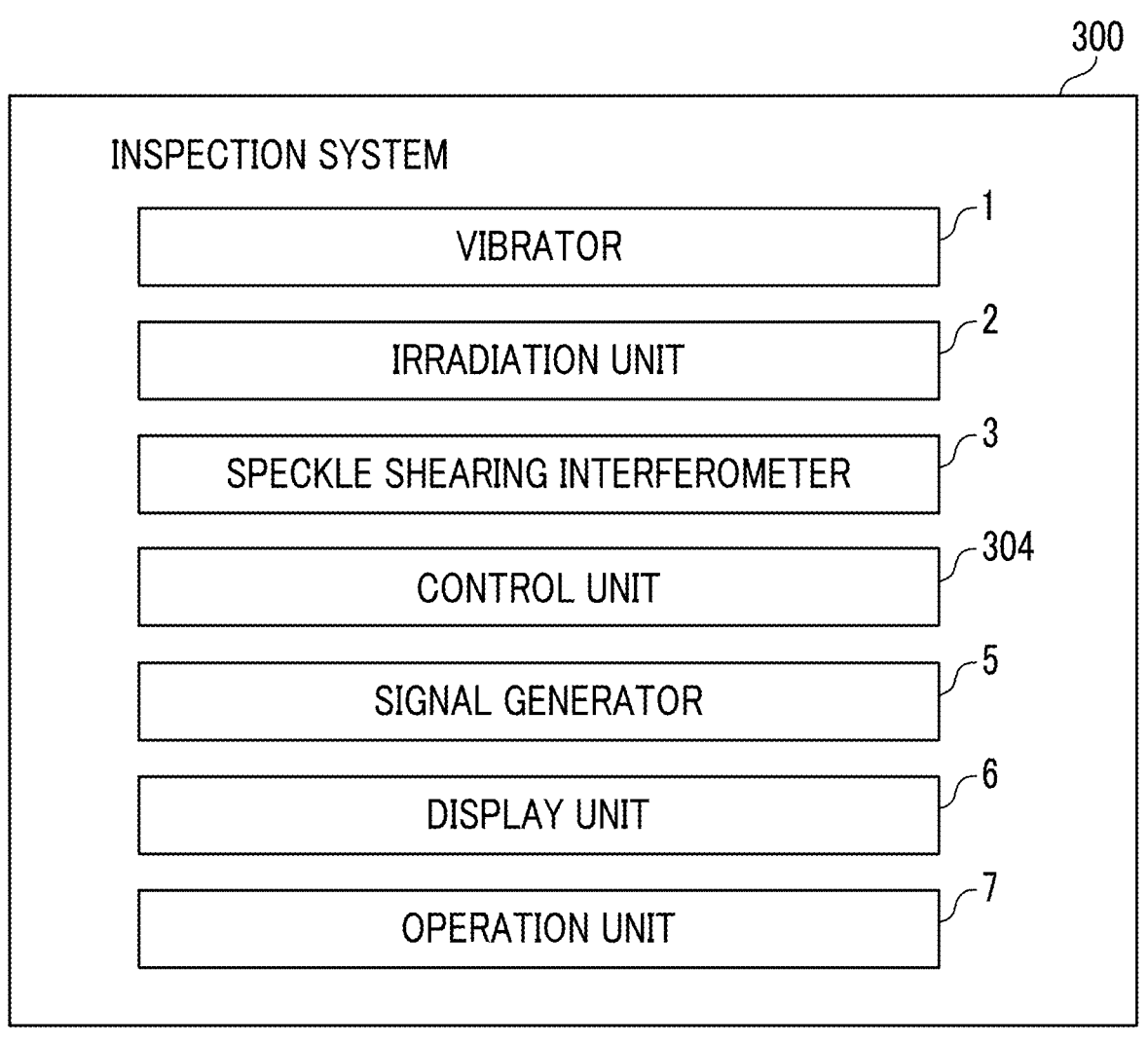
FIG. 12 is a block diagram showing a configuration of an inspection system according to a third embodiment.

As illustrated in FIG. 12, the inspection system 300 according to the third embodiment includes a control unit 304. The measurement of interference light by a speckle shearing interferometer 3 according to the third embodiment is the same as that of the first embodiment. The control unit 304 generates a complex number image D based on the measurement result by the speckle shearing interferometer 3 by the same control processing as the control unit 4 of the first embodiment. The control unit 304 is an example of an "image processing unit" within the claims.

Similarly to the control unit 4 of the first embodiment, the control unit 304 acquires a target image region $z(x_i)$ and a plurality of reference image regions $z(x_j)$ (j: 1 to N) from the generated complex number image D.

Figure 13:
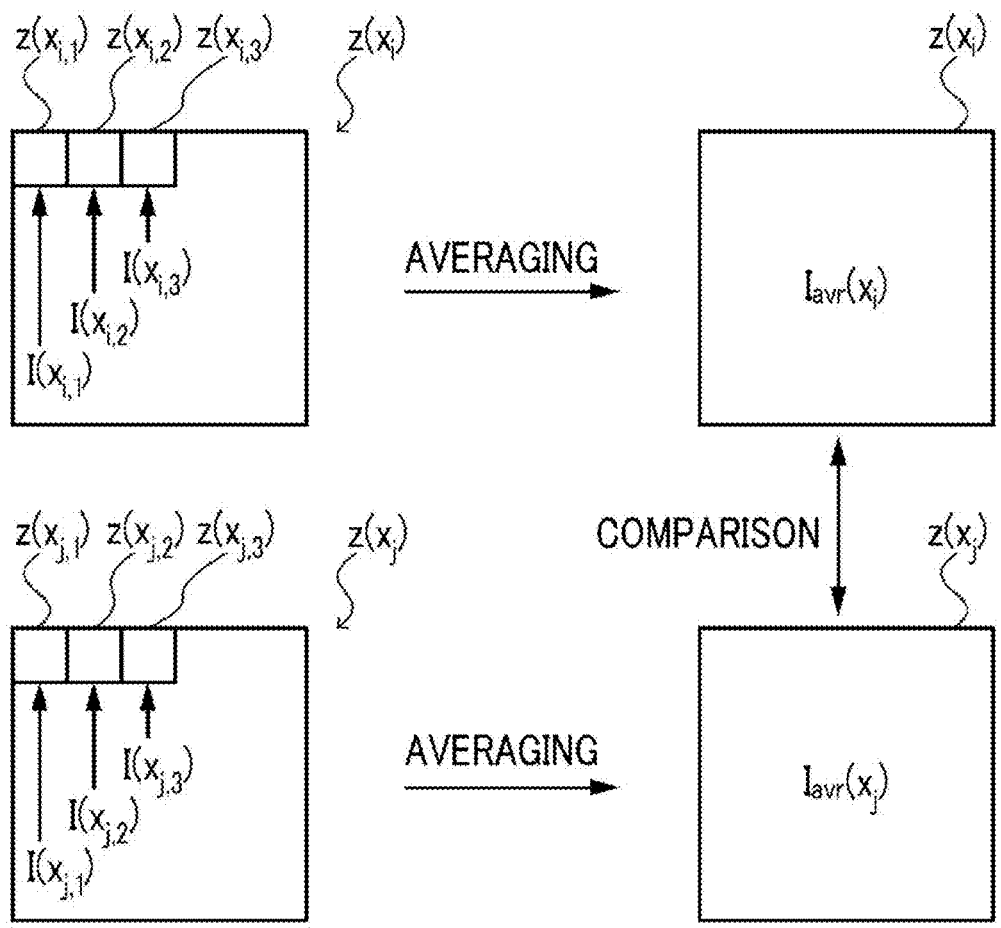
FIG. 13 is a diagram for describing the acquisition of an average value of pixels of a target image region and a reference image region according to the third embodiment.

As illustrated in FIG. 13, in the third embodiment, the control unit 304 is configured to acquire the degree of similarity by comparing an average value $I_{avr}(x_i)$ of a complex number $I(x_{i,\,k})$ representing each pixel $(z(x_{i,\,k}))$ in the target image region $z(x_i)$ and an average value $I_{avr}(x_j)$ of a complex number $I(x_{j,\,k})$ representing each pixel $(z(x_{j,\,k}))$ in the reference image region $z(x_j)$.

Specifically, the control unit 304 calculates the average value $I_{avr}(x_i)$ of the complex numbers $I(x_{i,\,k})$ representing n pixels included in the target image region $z(x_i)$. $I_{avr}(x_i)$ is expressed as $I_{avr}(x_i)=a_{avr}(x_i)+ib_{avr}(x_i)$. Similarly, the control unit 304 calculates the average value $I_{avr}(x_j)$ of the complex numbers $I(x_{j,\,k})$ representing the n pixels included in the target image region $z(x_j)$. The average value $I_{avr}(x_j)$ is expressed as $I_{avr}(x_j)=a_{avr}(x_j)+ib_{avr}(x_j)$. k=1 to n.

The control unit 304 compares the target image region $z(x_i)$ with the reference image region $z(x_j)$ to acquire the degree of similarity by calculating a difference between the average value $I_{avr}(x_i)$ and the average value $I_{avr}(x_j)$ and acquires the weight $p(z(x_i)|z(x_j))$ in a case where the reference image regions $z(x_j)$ are averaged by the average value $I_{avr}(x_i)$ and the average value $I_{avr}(x$ That is, the control unit 304 acquires the weight $p(z(x_i)|z(x_j))$ by using $a_{avr}(x_i)$ and $b_{avr}(x_i)$ instead of $a(x_{i,\,k})$ and $b(x_{i,\,k})$ in Equation (15) and using $a_{avr}(x_j)$ and $b_{avr}(x_j)$ instead of $a(x_{j,\,k})$ and $b(x_{j,\,k})$.

That is, in the third embodiment, unlike the control unit 4 of the first embodiment configured such that weighting and averaging based on the degree of similarity are executed for each pixel of the reference image regions $z(x_j)$, the control unit 304 is configured to perform weighting and averaging based on one degree of similarity for the reference image regions $z(x_j)$.

The control unit 304 weights and averages the reference image regions $z(x_j)$ to execute the noise suppression processing. Thus, the target image region $z(x_i)$ is acquired, and the noise of the complex number image D is suppressed.

The control unit 304 is configured to store the average value $I_{avr}(x_i)$ of the target image region $z(x_i)$ and the average value $I_{avr}(x_j)$ of the reference image region $z(x_j)$. In a case where the parameters $n_c$ and $n_r$ are changed, the control unit 304 is configured to calculate the weight by using the changed parameters $n_c$ and $n_r$ and the stored average values $I_{avr}(x_i)$ and average values $I_{avr}(x_j)$.

Other configurations of the third embodiment are the same as those of the first embodiment.

Effects of Third Embodiment

In the third embodiment, the following effects can be obtained.

In the third embodiment, as described above, the control unit 304 (image processing unit) is configured to acquire the degree of similarity by comparing an average value $I_{avr}(x_i)$ of a complex number $I(x_{i,\,k})$ representing each pixel in the target image region $z(x_i)$ and an average value $I_{avr}(x_j)$ of a complex number $I(x_{j,\,k})$ representing each pixel in the reference image region $z(x_j)$. With this configuration, the number of times the processing of calculating the comparison result is executed can be reduced as compared with the case where each pixel included in the target image region $z(x_i)$ is compared with each pixel included in the plurality of reference image regions $z(x_j)$. Thus, since a time required for the arithmetic processing executed to calculate the degree of similarity can be shortened, a time required for suppressing the noise of the complex number image D can be shortened.

Other effects of the third embodiment are the same as those of the first and second embodiments.

Modification Examples

The embodiments disclosed this time are illustrated in all respects and are not considered to be restrictive. The scope of the present invention is shown by the claims rather than the description of the above-described embodiments, and further includes all changes (modification examples) within the meaning and scope equivalent to the claims.

For example, in the first to third embodiments, although the inspection system 100 (200 or 300) in which the vibrator 1 (excitation unit), the irradiation unit 2, the speckle shearing interferometer 3 (measurement unit), and the control unit 4, 204, or 304 (image processing unit) are separately provided has been described, the present invention is not limited thereto. In the present invention, the excitation unit, the irradiation unit, the measurement unit, and the control unit may be integrally constituted as the defect inspection device. In this case, the control unit of the defect inspection device has the same configuration as the control units 4, 204, and 304 (image processing unit) of the first to third embodiments.

In the first to third embodiments, although it has been described that the noise distribution of the signal points is approximated so as to be distributed according to the two-dimensional normal distribution that spreads unevenly in the signal point direction from the origin on the complex plane in accordance with the magnitude of the amplitude of the periodic change in the vibration state of the inspection target P, the present invention is not limited thereto. In the present invention, the noise distribution of the signal points may be approximated so as to have a constant spread regardless of the magnitude of the amplitude of the periodic change in the vibration state. The noise distribution of the signal points may be approximated so as to be distributed according to a normal distribution that spreads isotropically without being uneven. The noise distribution of the signal points may be approximated so as to spread not only in the signal point direction but also in the orthogonal direction orthogonal to the signal point direction in accordance with the magnitude of the amplitude of the periodic change in the vibration state.

In the first to third embodiments, although it has been described that the parameters $n_c$ and $n_r$ indicating the degrees of spread of the distribution in a case where the noise distribution is approximated are changed, the present invention is not limited thereto. For example, all three parameters $n_c$, $n_r$, and $\gamma$ may be changeable, or only one of three parameters $n_c$, $n_r$, and $\gamma$ may be changeable. For example, the values of three appropriate parameters $n_c$, $n_r$, and $\gamma$ may be set in advance in a selectable manner so as to correspond to a material of the inspection target P and the like. It is considered that an optimum value of the parameter $n_c$ changes depending on an imaging environment such as lighting, while optimum values of the parameters $n_r$ and $\gamma$ do not change depending on the material of the inspection target P and the like. In this case, a calibration work is performed in advance, and thus, the noise suppression may be adjusted while the parameter $n_c$ is changed in a state where the parameters $n_r$ and $\gamma$ are set in accordance with the inspection target P.

In the first to third embodiments, although it has been described that the comparison result obtained by comparing the complex numbers $I(x)$ representing the pixels included in each of the target image region $z(x_i)$ and the plurality of reference image regions $z(x_j)$ is stored, the present invention is not limited thereto. For example, the comparison result may be recalculated whenever the parameters $n_c$ and $n_r$ are changed without storing the comparison result.

In the first to third embodiments, although the example of the non-local means processing of executing the noise suppression processing of the target image region $z(x_i)$ by averaging the weighted reference image regions $z(x_j)$ has been described, the present invention is not limited thereto. For example, the target image region $z(x_i)$ in which the noise is suppressed by using only the reference image region $z(x_j)$ in which the acquired weight $p(z(x_{i,\ k})|z(x_{j,\ k}))$ is equal to or greater than a predetermined threshold value may be calculated. A root mean square may be acquired instead of the simple average of the reference image regions $z(x_j)$.

In the second embodiment, although it has been described that the target image region $z(x_i)$ in which the noise is suppressed and the low frequency component is removed is acquired by weighting and averaging the plurality of reference image regions $z_{lowcut}(x_j)$ after the low frequency component is removed by using the weight $p(z(x_{i,\ k})|z(x_{j,\ k}))$ acquired based on the degree of similarity between the plurality of reference image regions $z(x_j)$ before the low frequency component is removed and the target image region $z(x_i)$, the present invention is not limited thereto. For example, after the low frequency component is removed, the weight $p(z(x_{i,\ k})|z(x_{j,\ k}))$ may be acquired based on the degree of similarity, and the reference image regions $z_{lowcut}$ $(x_j)$ may be weighted and averaged. After the plurality of reference image regions $z(x_j)$ are weighted and averaged by using the weight $p(z(x_{i,\ k})|z(x_{j,\ k}))$, the low frequency component may be removed.

In the third embodiment, although it has been described that the average values ($I_{avr}(x_i)$ and $I_{avr}(x_j)$) of each pixel of the target image region $z(x_i)$ and the reference image region $z(x_j)$ are acquired, the present invention is not limited thereto. For example, a median value or a mode value may be acquired instead of the average value.

In the first to third embodiments, although it has been described that the interference light which is the interfered laser beam is measured by using the speckle shearing interferometer 3, the present invention is not limited thereto. For example, the interference light may be measured by using a Michelson interferometer. A vibration state on an outer surface may be measured by an optical measurement method such as a digital image correlation method or a moire sampling method. The vibration state of the inspection target P may be measured by using a time of flight (ToF) camera.

In the first to third embodiments, although it has been described that each pixel of the entire complex number image D is corrected in accordance with the degree of interference coh(x), the present invention is not limited thereto. For example, in the complex number image D, only the pixel having the small degree of interference coh(x) may be extracted and corrected.

In the first to third embodiments, although it has been described that the vibration state image E on which the vibration state of the inspection target P in the measurement region Pa is visually recognizable is generated, the present invention is not limited thereto. For example, the region estimated to be the defect Q may be detected by detecting the continuity of the vibration. In this case, an image in which the region estimated to be the defect Q is recognizable or a numerical value such as coordinates may be output.

In the first to third embodiments, although the vibrator 1 is used as an example of the excitation unit that excites the elastic wave in the inspection target P, the present invention is not limited thereto. For example, the elastic wave may be excited by a loudspeaker that emits sound.

Aspects

It will be understood by those skilled in the art that the above illustrative embodiments are specific examples of the following aspects.

Item 1

An inspection system includes an excitation unit that excites an elastic wave in an inspection target, a measurement unit that measures a vibration state in the inspection target in which the elastic wave is excited by the excitation unit, and an image processing unit configured to suppress noise of a complex number image on which pixels are represented by a complex number indicating a periodic change in the vibration state of the inspection target based on a measurement result of the measurement unit. The image processing unit acquires a degree of similarity between a pixel included in a target image region defined in the complex number image and a pixel included in a plurality of reference image regions defined in the complex number image separately from the target image region by comparing complex numbers representing pixels, and executes noise suppression processing of the target image region by using a weight based on the acquired degree of similarity.

Item 2

In the inspection system according to item 1, the image processing unit is configured to approximate a noise distribution of signal points of complex numbers representing pixels of the target image region on a complex plane such that the noise distribution is distributed according to a two-dimensional normal distribution that spreads unevenly in a signal point direction from an origin on the complex plane in accordance with magnitude of an amplitude of the periodic change in the vibration state of the inspection target, and acquire the degree of similarity based on the approximated distribution.

Item 3

The inspection system according to item 2 further includes an operation unit that receives an operation of changing a parameter indicating a degree of spread of a distribution in a case where the noise distribution is approximated.

Item 4

In the inspection system according to item 3, the image processing unit is configured to store a comparison result obtained by comparing the complex numbers representing the pixels included in each of the target image region and the plurality of reference image regions, and acquire the degree of similarity by using the changed parameter indicating the degree of spread of the distribution and the stored comparison result in a case where the operation of changing the parameter indicating the degree of spread of the distribution is received.

Item 5

In the inspection system according to any one of items 1 to 4, the image processing unit is configured to execute, as the noise suppression processing, non-local means processing of suppressing noise of the target image region by averaging the plurality of reference image regions by using the weight based on the acquired degree of similarity.

Item 6

In the inspection system according to item 5, the image processing unit is configured to execute, as the noise suppression processing, non-local means processing of suppressing the noise of the target image region by removing low frequency components of the plurality of reference image regions and averaging the plurality of reference image regions in which the low frequency components are removed by using the weight based on the acquired degree of similarity.

Item 7

In the inspection system according to any one of items 1 to 6, the image processing unit is configured to acquire the degree of similarity by comparing an average value of the complex numbers representing the pixels of the target image region and an average value of the complex numbers representing the pixels of the reference image region.

Item 8

The inspection system according to any one of items 1 to 7 further includes an irradiation unit that irradiates the inspection target in which the elastic wave is excited by the excitation unit with laser beams. The measurement unit is configured to cause a reflected laser beam which is the laser beam emitted by the irradiation unit and reflected on the inspection target and a reference laser beam which is the laser beam emitted by the irradiation unit to interfere with each other, and capture and measure interference light obtained by causing the reflected laser beam and the reference laser beam to interfere with each other, and the image processing unit is configured to suppress the noise of the complex number image generated based on the measurement result of the captured interference light.

Item 9

In the inspection system according to item 8, the image processing unit is configured to acquire a degree of interference of the measured interference light, and is configured to correct the complex numbers representing the pixels by weighting the complex numbers representing the pixels of the complex number image in accordance with the acquired degree of interference.

Item 10

In the inspection system according to any one of items 1 to 9, the image processing unit is configured to generate a vibration state image on which the vibration state of the inspection target is visually recognizable based on the complex number image in which noise is suppressed by executing the noise suppression processing.

Item 11

An image processing method includes a step of acquiring a complex number image on which pixels are represented by a complex number indicating a periodic change in a state, a step of acquiring a target image region defined in the acquired complex number image and a plurality of reference image regions defined in the complex number image separately from the target image region, a step of acquiring a degree of similarity between a pixel included in the acquired target image region and a pixel included in the plurality of reference image regions by comparing complex numbers representing pixels, and a step of executing noise suppression processing of the target image region by using a weight based on the acquired degree of similarity.

Item 12

A defect inspection device includes an excitation unit that excites an elastic wave in an inspection target, an irradiation unit that irradiates the inspection target in which the elastic wave is excited by the excitation unit with laser beams, a measurement unit that measures a vibration state of the inspection target in which the elastic wave is excited by the excitation unit by causing a reflected laser beam which is the laser beam emitted by the irradiation unit and reflected on the inspection target and a reference laser beam which is the laser beam emitted by the irradiation unit to interfere with each other and capturing and measuring interference light obtained by causing the reflected laser beam and the reference laser beam to interfere with each other, and a control unit configured to suppress noise of a complex number image for defect inspection on which pixels are represented by a complex number indicating a periodic change in the vibration state of the inspection target based on a measurement result of the measurement unit. The control unit acquires a degree of similarity between a pixel included in a target image region defined in the complex number image and a pixel included in a plurality of reference image regions defined in the complex number image separately from the target image region by comparing complex numbers representing pixels, and executes noise suppression processing of the target image region by using a weight based on the acquired degree of similarity.

What is claimed is:

1. An inspection system comprising:
   a vibrator that excites an elastic wave in an inspection target;
   a measurer that measures a vibration state in the inspection target in which the elastic wave is excited by the vibrator; and
   an image processor configured to suppress noise of a complex number image on which pixels are represented by a complex number indicating a periodic change in the vibration state of the inspection target based on a measurement result of the measurer,
   wherein the image processor
   acquires a degree of similarity between a pixel included in a target image region defined in the complex number image and a pixel included in a plurality of reference image regions defined in the complex number image separately from the target image region by comparing complex numbers representing pixels, executes noise suppression processing of the target image region by using a weight based on the acquired degree of similarity, and
   is configured to approximate a noise distribution of signal points of complex numbers representing pixels of the target image region on a complex plane such that the noise distribution is distributed according to a two-dimensional normal distribution that spreads unevenly on the complex plane, and acquire the degree of similarity based on the approximated distribution.

2. The inspection system according to claim 1,
   wherein the image processor is configured to approximate the noise distribution of the signal points of the complex numbers representing the pixels of the target image region on the complex plane such that the noise distribution is distributed according to the two-dimensional normal distribution that spreads unevenly in a signal point direction from an origin on the complex plane in accordance with magnitude of an amplitude of the periodic change in the vibration state of the inspection target, and acquire the degree of similarity based on the approximated distribution.

3. The inspection system according to claim 2, further comprising:
   an operation device that is connected with the image processor and receives an operation of changing a parameter indicating a degree of spread of a distribution in a case where the noise distribution is approximated.

4. The inspection system according to claim 3,
   wherein the image processor is configured to store a comparison result obtained by comparing the complex numbers representing the pixels included in each of the target image region and the plurality of reference image regions, and acquire the degree of similarity by using the changed parameter indicating the degree of spread of the distribution and the stored comparison result in a case where the operation of changing the parameter indicating the degree of spread of the distribution is received.

5. The inspection system according to claim 1, wherein the image processor is configured to execute, as the noise suppression processing, non-local means processing of suppressing noise of the target image region by averaging the plurality of reference image regions by using the weight based on the acquired degree of similarity.

6. The inspection system according to claim 5, wherein the image processor is configured to execute, as the noise suppression processing, non-local means processing of suppressing the noise of the target image region by removing low frequency components of the plurality of reference image regions and averaging the plurality of reference image regions in which the low frequency components are removed by using the weight based on the acquired degree of similarity.

7. The inspection system according to claim 1, wherein image processor is configured to acquire the degree of similarity by comparing an average value of the complex numbers representing the pixels of the target image region and an average value of the complex numbers representing the pixels of the reference image region.

8. The inspection system according to claim 1, further comprising:

an irradiator that irradiates the inspection target in which the elastic wave is excited by the vibrator with laser beams, wherein the measurer is configured to cause a reflected laser beam which is the laser beam emitted by the irradiator and reflected on the inspection target and a reference laser beam which is the laser beam emitted by the irradiator to interfere with each other, and capture and measure interference light obtained by causing the reflected laser beam and the reference laser beam to interfere with each other, and the image processor is configured to suppress the noise of the complex number image generated based on a measurement result of the captured interference light.

9. The inspection system according to claim 8, wherein the image processor is configured to acquire a degree of interference of the measured interference light, and is configured to correct the complex numbers representing the pixels by weighting the complex numbers representing the pixels of the complex number image in accordance with the acquired degree of interference.

10. The inspection system according to claim 1, wherein the image processor is configured to generate a vibration state image on which the vibration state of the inspection target is visually recognizable based on the complex number image in which noise is suppressed by executing the noise suppression processing.

11. An image processing method comprising:

a step of acquiring a complex number image on which pixels are represented by a complex number indicating a periodic change in a state;

a step of acquiring a target image region defined in the acquired complex number image and a plurality of reference image regions defined in the complex number image separately from the target image region;

a step of acquiring a degree of similarity between a pixel included in the acquired target image region and a pixel included in the plurality of reference image regions by comparing complex numbers representing pixels; and a step of executing noise suppression processing of the target image region by using a weight based on the acquired degree of similarity, wherein the step of acquiring the degree of similarity includes approximating a noise distribution of signal points of complex numbers representing pixels of the target image region on a complex plane such that the noise distribution is distributed according to a two-dimensional normal distribution that spreads unevenly on the complex plane, and acquiring the degree of similarity based on the approximated distribution.

12. A defect inspection device comprising:

a vibrator that excites an elastic wave in an inspection target;

an irradiator that irradiates the inspection target in which the elastic wave is excited by the vibrator with laser beams;

a measurer that measures a vibration state of the inspection target in which the elastic wave is excited by the vibrator by causing a reflected laser beam which is the laser beam emitted by the irradiator and reflected on the inspection target and a reference laser beam which is the laser beam emitted by the irradiator to interfere with each other and capturing and measuring interference light obtained by causing the reflected laser beam and the reference laser beam to interfere with each other; and a controller configured to suppress noise of a complex number image for defect inspection on which pixels are represented by a complex number indicating a periodic change in the vibration state of the inspection target based on a measurement result of the measurer, wherein the controller acquires a degree of similarity between a pixel included in a target image region defined in the complex number image and a pixel included in a plurality of reference image regions defined in the complex number image separately from the target image region by comparing complex numbers representing pixels, executes noise suppression processing of the target image region by using a weight based on the acquired degree of similarity, and the controller is configured to approximate a noise distribution of signal points of complex numbers representing pixels of the target image region on a complex plane such that the noise distribution is distributed according to a two-dimensional normal distribution that spreads unevenly on the complex plane, and acquire the degree of similarity based on the approximated distribution.

* * * * *